(12) United States Patent
McCormick, Jr.

(10) Patent No.: US 6,590,852 B1
(45) Date of Patent: Jul. 8, 2003

(54) MASSIVELY-PARALLEL WRITING AND READING OF INFORMATION WITHIN THE THREE-DIMENSIONAL VOLUME OF AN OPTICAL DISK, PARTICULARLY BY USE OF A DOUBLY-TELECENTRIC AFOCAL IMAGING SYSTEM

(75) Inventor: Frederick Bossert McCormick, Jr., San Diego, CA (US)

(73) Assignee: Call/Recall, Inc., San Diego, CA (US)

( * ) Notice: Subject to any disclaimer, the term of this patent is extended or adjusted under 35 U.S.C. 154(b) by 0 days.

(21) Appl. No.: 09/225,618

(22) Filed: Jan. 5, 1999

(51) Int. Cl.[7] .................................................. G11B 7/00
(52) U.S. Cl. ................... 369/112.23; 369/120
(58) Field of Search .......................... 369/94, 102, 103, 369/112.01, 112.23, 112.25, 112.26, 120, 121, 124.02, 124.09, 275.1, 275.3, 280, 288

(56) References Cited

U.S. PATENT DOCUMENTS

| | | | | |
|---|---|---|---|---|
| 4,450,553 A | * | 5/1984 | Holster et al. ............ | 369/275.5 |
| 5,097,464 A | * | 3/1992 | Nishiuchi et al. ........ | 369/112.29 |
| 5,134,604 A | * | 7/1992 | Nagashima et al. ....... | 369/94 |
| 5,163,039 A | * | 11/1992 | Lindmayer ................. | 369/100 |
| 5,325,324 A | * | 6/1994 | Rentzepis et al. ........ | 365/127 |
| 5,414,451 A | * | 5/1995 | Sugiyama et al. ......... | 347/258 |
| 5,614,938 A | * | 3/1997 | Sugiyama et al. ......... | 347/247 |
| 5,708,532 A | * | 1/1998 | Wartmann .................. | 359/663 |

* cited by examiner

*Primary Examiner*—Paul W. Huber
(74) *Attorney, Agent, or Firm*—Fuess & Davidenas

(57) ABSTRACT

A volume radiation memory, nominally a 2.5 cm (1") diameter 6 mm thick optical disk, is preferably written in parallel by two-photon absorption within, and read with massive parallelism by a single-beam-induced fluorescence of, spherical voxels of nominal diameter 2 microns spaced 2 microns center-to-center and arrayed 32×128 in planar segments that are tilted typically 40° to the planar surfaces of the disk, and that are typically located within a 5 mm thick central volume of the disk. Imaging of the voxels within the tilted planar segment for reading is through a two-lens doubly-telecentric afocal lens imaging system to a detector, normally an array of active pixel sensors or charge-coupled devices, located in the conjugate plane. Voxel illumination for reading may be orthogonal from the side of the disk, confocal-theta from a side of the disk, or co-linear through the doubly-telecentric afocal lens. Volumetric storage capacity is typically 5.89 gigabits (5.9×10E9 bits), and readout speed is typically 1.6 gigabits/second (1.6×10E9 bits/second) with a 30 millisecond maximum latency at a 1300 rpm disk rotation rate.

39 Claims, 21 Drawing Sheets

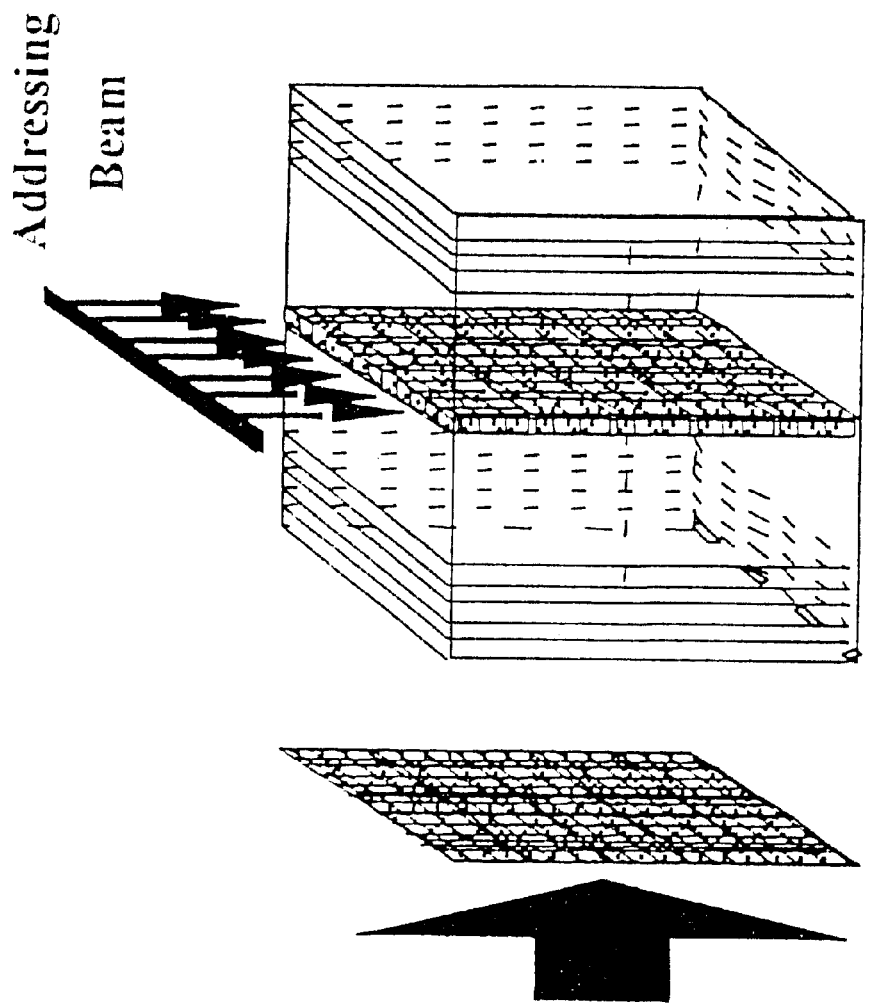

output input

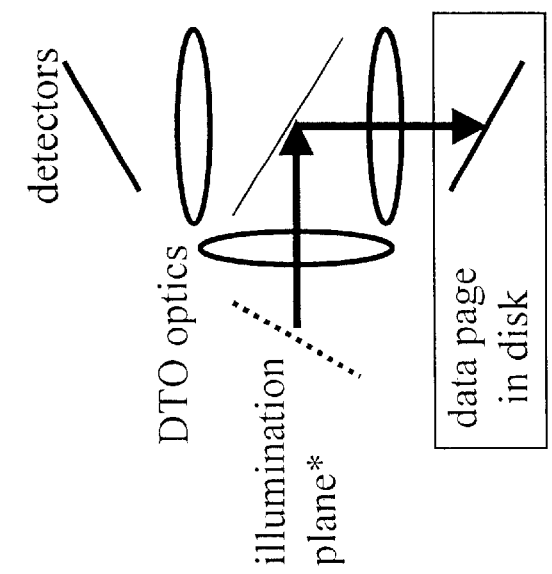
Fig. 15c
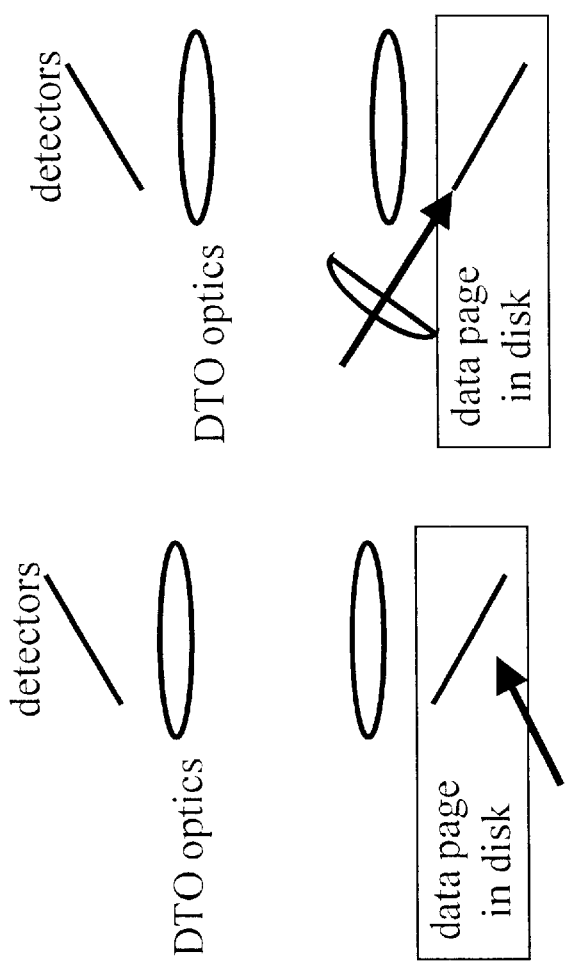
Fig. 15b
Fig. 15a

MASSIVELY-PARALLEL WRITING AND READING OF INFORMATION WITHIN THE THREE-DIMENSIONAL VOLUME OF AN OPTICAL DISK, PARTICULARLY BY USE OF A DOUBLY-TELECENTRIC AFOCAL IMAGING SYSTEM

BACKGROUND OF THE INVENTION

1. Field of the Invention

The present invention generally concerns devices, methods, imaging systems and media for radiatively recording (writing) and radiatively reading digital data within the three-dimensional volume of optical media, principally optical disks.

The present invention particularly concerns a (i) two-photon (two-beam) writing method, and single-photon (single-beam) readout method, using a (ii) doubly-telecentric afocal imaging system for the (iii) massively parallel recording (writing) and (iv) reading of digital data within the three-dimensional volume of an optical medium, preferably a rotating optical disk containing a photoactive chemical.

The present invention still more particularly concerns a digital video/versatile disk ("DVD"), compact disk ("CD") any kind of optical disk (generically "CDs") in which digital data storage is three-dimensional (3-D), thus a "3-D CD".

Key words to the present invention include: optical memory; three-dimensional memory; volume memory; two-photon memory; multilayer imaging; depth transfer objective ("DTO"); DTO with a non-immersed detector; DTO with an immersed detector; DTO with aberration correction; Non-1:1 DTO imaging systems; doubly telecentric imaging; afocal imaging; 4-f imaging configurations; three-dimensional optical or compact disks ("3-D CDs"); and three-dimensional Digital Video Disks or Digital Versatile Disks ("3-D DVDs").

2. Description of the Prior Art

2.1 General Background

Information processing applications once in the realm of supercomputing (e.g., 3-D visualization, virtual reality, data mining) are now moving to the desktop and even to mobile computing platforms. This rapid evolution of the information age has led to an explosive growth in the demand for high-capacity/high-performance secondary storage. Optical storage has been a candidate to meet this demand for some time. The optical disk, most particularly the compact disk (CD) and the newer Digital Video Disk (DVD) (sometimes called Digital Versatile Disk), are successful forms of inexpensive mass digital data storage. Although optical storage has greatly evolved, so also has the magnetic, Winchester, disk evolved greatly. Moreover, magnetic recording is still rapidly evolving, including by new exploitation of the giant magnetorestrictive effect.

The strengths of optical recording and recording media— large storage capacities and low cost—will likely ensure the perpetuation of this method and media into the foreseeable future. However, an even larger role for optical recording, and media, could be foreseen if, while preserving and even enhancing its present strengths, optical recording was to draw closer to or, preferably, even exceed the performance of magnetic recording in any of (i) gross capacity, (ii) cost per bit stored, (iii) seek, or latency, time, (iv) sustained data transfer rate for both reading and writing, and (v) reusability, and longevity. At the present time (circa 1998) many things differ between optical and magnetic storage. The weights, sizes and power consumption of optical and magnetic disk drives are slightly different. One or another media can, in one form or another, store more (or less) than forms of the other media. Optical disks have generally had, until recently, similar or greater capacity per disk platter than magnetic disks. However, the tiny size of the heads of magnetic disks permits many disk platters—typically 14 to 16 in present-day 49 Gbyte capacity drives—to be stacked on one spindle with a head on each side of each disk platter, thus greatly increasing the overall capacity of a magnetic disk drive over an optical disk drive. On the other hand, optical disks have typically offered lower cost for high capacity, easy removability, and long archival lifetimes.

Data transfer rates are commensurate for magnetic and for optical disks. However, latency times to access data on a spinning magnetic disk are presently superior to those of an optical disk. Additionally, those generally more expensive forms of optical disk that can be written at all can generally be written only but much slower than can magnetic disks, and often for only but a limited number of times.

The present invention will soon be seen, by effectively "stacking" optical disk platters, to greatly change many of these previous relationships of cost, speed and latency. However, antecedent activities to the present invention are first discussed.

To meet the demand for high-performance optical digital data storage, there are two main trends apparent in present-day (circa 1998) research and development. Volumetric storage and data channel parallelism together are the key routes to achieving the capacities and transfer rates needed in future military and commercial applications. Both of these techniques require the development of novel parallel optical pick-up heads. See K. Kayanuma, T. Iwanaga, H. Inada, K. Okanoue, R. Katayama, K. Yoshihara, Y. Yamanaka, M. Tsunekane, O. Okada, "*High track density magneto-optical recording using crosstalk canceler,*" Proc. SPIE 1316, 35 (1990). See also T. Maeda, H. Sugiyama, A. Saitou, K. Wakabayashi, H. Miyamoto, and H. Awan, "*High-density recording by two-dimensional signal processing,*" Proc. SPIE 2514,70(1995). See also S. Gopalaswamy and B. V. K. V. Kumar, "*Multichannel decision feedback equalizer for high track density in optical recording,*" Opt Eng. 35,2386 (1996).

Recent developments in optical storage also include the evolution of CD-ROM technology to volumetric systems such as the 2-layer digital versatile disk (DVD) standard. The present invention will be seen to extend this concept to a technology enabling the recording and reading of disks having hundreds or thousands of layers, potentially leading to more than a 100 times increase in capacity. See F. B. McCormick, I. Cokgor, S. C. Esener, A. S. Dvornikov, and P. M. Rentrepis, "*Two-photon absorption-based 3-D optical memories,*" in High Density Data Recording and Retrieval Technologies, Ted. A. Schwartz; Martin Francis, Editors, Proc. SPIE 2604,23–32(1996). See also I. Cokgor, P. B. McCormick, A. S. Dvornikov, M. M. Wang, N. Kim, K. Coblentz; S. C. Esener, P. M. Rentrepis, "*Multilayer disk recording using 2-photon absorption and the numerical simulation of the recording process,*" in Optical Data Storage '97, 1997 OSA Technical Digest Series (Optical Society of America, Washington, DC, 1996).

2.2 Two-Photon Optical Processes

One embodiment of the optical storage in accordance with the present invention will be seen to rely on recording bits in a volume by process of two-photon absorption (i.e., "3-D 2-P"). A spot is written in the volume of a molded organic polymer only at points of temporal and spatial intersection of two beams collectively having sufficient photon energies—beam one carrying information (i.e., at 1064 nm) and the other intersecting so as to specify location (i.e., at 532 nm)—so as to change the optical property of a photochemical at the region of intersection, and nowhere else. The simultaneous absorption of photons from both beams results in a photochemical change in the active molecules doped into the polymer, which changes the absorption and fluorescence spectra of the material (though changes in refractive index, electrical characteristics, etc., may also be obtained with appropriately engineered dopant molecules).

The recorded bits are read by fluorescence when excited by single green photons absorbed within the written spot volume(s). By intersecting a sheet of light with a 2-D page of data bits, lines (vectors) or planes of data marks may be both written and, at other times, read, in parallel. Using this method, the assignee of the present invention—Call/Recall Corporation—has demonstrated multiple image storage in read only memory ("ROM") configuration in a portable player unit. The results indicate no crosstalk between layers and excellent stability of the written bits at room temperature. As many as 100 layers have been stored in an 8 mm thick cube. See M. M. Wang, S. E. Esener, F. B. McCormick, I. Cokgor, A. S. Dvornikov, P. M. Rentzepis, "*Experimental characterization of a two-photon memory*," Optics Letters 22(8), pp. 558–560 (1996)

A recent monolithic disk recording experiment has demonstrated 120 layer recording. Separate experiments have recorded layers as close as 30 μm without crosstalk, with bit domains, or voxels, as small as 7 μm diameter. Thus the fabrication of ultra-high capacity 3-D multi-layer disk appears feasible. However, to exploit this new storage media, a means to efficiently and cost effectively access the data stored throughout the volume of the disk is needed.

2.3 Optical Disks

Current multi-layer optical read techniques (e.g., for DVD optical storage disks) read a single track on a single layer. When access to data on another layer is necessary, the objective lens is moved to refocus onto that layer. This refocusing distance is typically less than 100 microns. However, it cannot generally be accomplished without a break in the data stream due to the need to reestablish the correct focus and accurate tracking on the new track, and to synchronize the data channel clock to the new data stream. Extension of this current technique to thick multi-layer having many recorded layers disks is problematic.

First, the many layers may be reasonably distributed within a thickness of 5–10 mm. To rapidly focus onto layers distributed over this large range would require a dynamic focus actuator of undesirable size, cost, and power dissipation.

Focusing over this large thickness range also introduces large amounts of aberration into the optical path. To maintain the high resolution required of these systems, an aberration control system with high speed and large dynamic range would be needed.

To efficiently use the high capacity offered by the multi-layer approach, it is also necessary to provide increased data transfer rates. A powerful means of increasing data transfer rates is to read multiple tracks simultaneously. However, reading more than one track at a time requires a lens with a larger field of view ("FOV"), where the FOV is typically defined as the lateral distance over which (i) the optical aberration is "well-corrected" and (ii) the resolution is limited mainly by diffraction. Such wide field lenses are generally larger, heavier, and more expensive than the single-spot lenses used in optical storage systems today. Thus any new technique should seek to read the most data marks within the smallest two-dimensional FOV in order to limit this increased complexity and cost.

Parallel readout techniques for single layer media have been proposed and demonstrated which simultaneously read several tracks along a radius or a chord of the disk. However, scaling these approaches to large numbers of tracks is difficult, since the 1-D nature of the line of bits does not efficiently use the 2-D optical FOV. On the other hand, reading a 2-D array of marks from different regions requires that the should disk step from one 2-D page to the next, starting and stopping rather than rotating continuously. This introduces problems in accelerating and decelerating the disk, and in keeping the subsequent vibrations from affecting the data signal integrity.

2.4 Particular Prior Art—Optical Disks

The present invention, although applicable to volume optical memories of all geometric forms (such as, for example, cubical), will seen to preferably be embodied in an optical disk. Accordingly, the state of the art in accessing information within the volume of an optical disk is reviewed herein.

U.S. Pat. No. 4,450,553 for a MULTILAYER INFORMATION DISC to Holster, et al., and assigned to U.S. Phillips Corporation (New York, N.Y.) concerns a multilayer information disc, in particular a video disc, which is read by laser light. The disc comprises at least two radiation-reflecting optical structures each having a relief-like information track of regions situated alternately at a higher and a lower level which is read in reflection and on the basis of phase differences. Each of the optical structures is covered with a reflection layer at least one of which partially transmits the reading radiation so that upon reading the other optical structure or structures, the radiation passes through the structure provided with the partially transmitting reflection layer. The coefficients of reflection of the various reflective layers are preferably matched to each other in a manner such that upon reading the same amount of light returns from each optical structure. A suitable material for the partially reflective layer is a dielectric which has no light absorption.

U.S. Pat. No. 5,097,464 for an OPTICAL RECORDING MEDIUM AND OPTICAL RECORDING/REPRODUCING APPARATUS to Nishiuchi, et al., and assigned to Matsushita Electric Industrial Co., Ltd. (Osaka, Japan) concerns a data playback apparatus for reproduction of data from an optical recording medium which has a data layer disposed on a substrate thereof having a specific thickness is provided with an optical length corrector interposed between the recording medium and an objective lens for converging a light beam. The optical length corrector is selected so that the sum of the optical length od the optical length of the optical length corrector equals a predetermined length for the objective lens. Accordingly, the light passing the objective lens can converge on the data layer developing a light spot close to the limit of refraction, regardless of the thickness of the substrate of the recording medium.

U.S. Pat. No. 5,134,604 for a COMBINATION OPTICAL DATA MEDIUM WITH MULTIPLE DATA SURFACES AND CASSETTE THEREFOR to Nagashima, et al., and assigned to Matsushita Electric Industrial Co., Ltd. (Osaka, Japan) concerns an optical data medium from which information recorded to the surface is reproduced by focusing a laser thereon and reading the light reflected from the data surface. The medium includes a first transparent layer having a top data surface for carrying data, and a second transparent layer having a bottom data surface for carrying data. A semi-transparent layer is inserted between the first and second transparent layers. When the laser is focused on the top data surface, the data carried therein is reproduced, and when the laser is focused on the bottom data surface, the data carried therein is reproduced.

U.S. Pat. No. 5,163,039 for a THREE-DIMENSIONAL OPTICAL MEMORY SYSTEM to Lindmayera and assigned to Quantex Corporation (Rockville, Md.) concerns a three-dimensional optical memory system is disclosed which utilizes at least two layers of electron trapping media having different sensitivities to visible light coated on a substrate to store data in the form of light energy. Data is written onto the substrate, which may be in the form of a disk, which is contained in a light-tight contamination-free environment similar to a Winchester hard disk drive system, using at least two visible light laser beams having different wavelengths. Data is read from the disk using an infrared light laser beam. The at least two different data streams are separately detected. The system may be used as part of an optical disk drive system which is desini or 5¼ inch disk drive form factor for personal computers.

U.S. Pat. No. 5,414,451 for a THREE-DIMENSIONAL RECORDING AND REPRODUCING APPARATUS to Sugiyama, et al., and assigned to Hitachi, Ltd. (Tokyo, JP) concerns a three-dimensional recording and reproducing apparatus having a recording medium including a plurality of recording layers stacked on a substrate and an optical system for converging a light irradiated from the substrate side on each of the plurality of recording layers to three-dimensionally record and reproduce information. A light spot is focused on each layer of the multi-layer structured disc to record and reproduce highly reliable data in a high density. An equation relating the light wavelength, substrate refractivity, focal lens numerical aperture, and positional range in the optical axis on which exists a recording layer upon which light is converged, is satisfied.

U.S. Pat. No. 5,614,938 for a THREE-DIMENSIONAL RECORDING AND REPRODUCING APPARATUS to Sugiyama concerns a three-dimensional recording and reproducing apparatus having a recording medium including a plurality of recording layers stacked on a substrate and an optical system for converging a light irradiated from the substrate side on each of the plurality of recording layers to three-dimensionally record and reproduce information. The same equation as is satisfied for the above U.S. Pat. No. 5,414,451 to Sugiyama, et al. is again satisfied.

2.5 Particular Prior Art—Error Correction Codes, Particularly for Optical Storage The present invention is not about error correction codes. Indeed, at certain domain dimensions and optical signal-to-noise ratios of the volume optical memory of the present invention, error correction is not required, and the successful implementation of the present invention does not in any substantial manner depend upon error correction codes. However, it is well known that both existing (i) semiconductor and (ii) magnetic computer memories constrain, and manage, the occurrence of error. Even if an optical memory were to be less, or much less, prone to error than competing semiconductor and magnetic forms of digital memory, it would be rash to talk about supplanting these existing forms with optical memory without explaining the management of such errors as may inevitably occur in optical memory.

The present invention opens up a practical application for the mathematical error correction of (optical) bits (optically) detected in a plane of bits, and typically very large planes of a million or more bits each successively read very fast, typically at perhaps one full bit plane, or page, every microsecond. The present section simply makes note of the existing theory, and processes, for error correction in such a regime.

As is well know by practitioners of the arts of designing and using error correction codes (ECC), optimal ECC's for any particular application are a function of many variables including the data block size for which errors must be corrected, the error rate, the correlations in space and/or time (if any) between errors, and the reliability with which error-free data must be reconstituted. The present invention will be seen, in various of its preferred embodiments, to radiatively write, and read, a great number of voxels storing binary bits at one time and in parallel. Although the signal to noise ratio for these operations is excellent, the possibility of error due to many causes in both the media and the media reading and writing system always exists, and ECC's are commonly employed.

Luckily, a great deal is known about correcting errors in optically stored information. See, for example, the following references:

S. A. Dombrovski, "*Effectiveness of using error-correcting codes in holographic storage systems,*" Optoelectron. Instrumen., Vol. 2, pp. 58–62, 1989.

B. J. Goertzen and P. A. Mitkas, "*Error-correcting code for volume holographic storage of a relational database,*" Optics Letters, Vol. 20, No. 15, pp. 1655–7, Aug. 1, 1995.

M. A. Neifeld and J. D. Hayes, "*Error-correction schemes for volume optical memories,*" Applied Optics, Vol. 34, No. 35, pp. 8183–90, Dec. 10, 1995.

M. A. Neifeld and J. D. Hayes, "*Parallel error correction for optical memories,*" Optical Memory and Neural Networks, Vol. 3, No. 2, pp. 87–98, 1994.

B. H. Olson and S. C. Esener, "*Partial response precoding for parallel-readout memories,*" Optical Letters, Vol. 19, No. 4, pp. 661–3, May 1, 1994.

Wei-Feng Hsu and Alexander A. Sawchuk, "*Improved Usable Capacity for Optical Page-Oriented Memories with Smart Pixel Interfaces,*" International Symposium on Optical Memory and Optical Data Storage, Optical Society of America, Maui, Hi., Jul. 8–12, 1996.

Wei-Feng Hsu and Alexander A. Sawchuk, "*Design of Smart Pixel Interfaces for Volume Optical Memories,*" Proc. 1996 International Topical Meeting on Optical Computing, OC '96, Sendai, Japan, Apr. 21–25, 1996.

Steve Blair and Kelvin Wagner, "*Inverse filtering during recording for page-oriented optical storage,*" Optical Processing and Computing, SPIE's International Technical Working Group Newsletter), pp. 3,4,12, October 1997.

T. Maeda, H. Sugiyama, A. Saitou, K. Wakabayashi, H. Miyamoto, and H. Awan, "*High-Density Recording by Two-Dimensional Signal Processing,*" SPIE, vol. 2514, pp. 70–72.

Sieji Kobayashi, Toshihiro Horigome, Joost P. de Kock, Hisayuki Yamatsu, and Hiroshi Ooki, "*Single carrier independent pit edge recording,*" SPIE, vol. 2514, pp. 73–81.

Jeffrey Zarnowski and Matt Pace, "*Imaging options expand with CMOS technology,*" Laser Focus World, pp. 125–130, June 1997.

Generally, (i) the detection of optically-recorded data can be quite sophisticated, and (ii) electronic computational parallelism can be invoked for the high-data-rate post-detection correction of errors occurring in two-dimensional, or bit plane, optically-detected data. In combination, state-of-the-art (i) optical detection and (ii) error correction are not presently believed to any substantial hindrance to realization of certain optical memories of the present invention which, in their more extreme forms with data transfer rates on the order of 1 terabits/second (1 terabit, or $1 \times 10^{12}$ bits, per second), are faster than any other form of digital memory heretofore realized.

2.6 Particular Prior Art—Doubly-telecentric Afocal Lenses

The present invention will be seen to use a doubly-telecentric lens-based afocal imaging system. Although, to the best knowledge of the inventor, doubly-telecentric afocal lenses have not heretofore been used in conjunction with optical memories and/or optical recording, the optical properties of the doubly-telecentric afocal lens configuration are known, and these lenses have previously been used in optical distance measurement.

For example, U.S. Pat. No. 5,708,532 for a DOUBLE-SIDED TELECENTRIC MEASUREMENT OBJECTIVE to Wartmann assigned to Jos. Schneider Optische Werke Kreuznach GmbH & Co. KG (Kreuznach, DE) concerns a double sided telecentic measurement objective for contactless length measurement in two-dimensional and three-dimensional space. The objective has an image-side optical system consisting of three elements equivalent to those of an object-side optical system but in the reverse order, including a cemented positively refracting lens element turned toward the object of image respectively, a collecting lens spaced by an air gap from the cemented lens, and a dispersive meniscus spaced by an air gap from the collecting lens. The widths of the air gaps between the collecting lenses and the meniscus are substantially greater than the widths of air gaps between the cemented lens elements and the collecting lenses.

SUMMARY OF THE INVENTION

The present invention contemplates devices, methods, imaging systems and optical media serving to optically record (write), and read, digital data (i) at massive parallelism (ii) within the three-dimensional volume of an optical medium—preferably a rotating optical disk made of inexpensive polymer plastic containing an photoactive chemical (a "photochemical")—by use of (iii) a depth-transfer optical (lens-based) read/write head, particularly of the doubly-telecentric afocal type.

The preferred embodiment of the invention is thus a three-dimensional ("3-D") optical disk system—similar to the optical disks known as the Compact Disk ("CD") or the Digital Video/Versatile Disk ("DVD")—or a "3-D CD" system for short.

The recording, or writing process is preferably, but not invariably, by a two-photon (i.e., a two-beam) optical, also known as a radiation, process ("2-P"). The reading process is preferably a one-photon (i.e., a single-beam) optical, or radiation, process ("1-P"). The preferred embodiment of the invention may thus be concisely referred to as a "2-P write", and a "1-P read", 3-D CD optical, or radiation, memory.

1. Immediate Background to the Invention: Photochemicals and Two-Photon Absorption The primary aspect of the present invention is a Depth-Transfer Optical ("DTO"), lens-based, read/write head, particularly of the doubly-telecentric afocal type, and the volume radiation, or optical memory (especially as may be of the 2-P write 1-P read 3-D CD type) that may be written and read (at massive parallelism) by use of such a read/write head.

However, it is useful to understand exactly what photosensitive medium is being radiatively written and read, and how it is so written and read, before the new doubly-telecentric afocal lens read/write head of the present invention is discussed. Accordingly, certain preferred storage media of the volume radiation, or optical, memory of the present invention are first discussed in this section.

The memory of the present invention, including in its preferred 3-D CD form, may be implemented so as to be fully readable, writeable, erasable and rewriteable. If so implemented then the preferred photochemical of the memory is spirobenzopyran. Spirobenzopyran is a known photochemical the use of which in optical memories is taught in, for example, in prior U.S. Pat. No. 5,325,324 for a THREE-DIMENSIONAL OPTICAL MEMORY. If so implemented then reliable permanent storage in the memory can only be realized when the memory is written, read, and maintained at considerably colder than room temperature, preferably much less than 0° C.

Instead of being implemented as a read-write-erasable memory, the preferred 3-D CD memory of the present invention is strongly preferably implemented as a memory of the read-once, write-many, or WORM, type. In this realm the preferred 3-D CD memory of the present invention is fully operative for reading, writing and long term stable information storage entirely at room temperature (although undue exposure to strong extraneous light radiation is to be avoided in a similar manner that magnetic disks are preferably not exposed to strong magnetic fields).

The preferred 3-D CD memory of the present invention is so preferably implemented as a memory of the "Write Once, Read Many" or "WORM", type by the use of a novel writing method employing new photochemicals. (This method and these new photochemicals are the invention of others, and, although taught within the present specification disclosure, are not the subject of the present invention.) In the new methods (i) dye precursor molecules that are reactive with at least one of acids, bases, ions or radicals to produce dye molecules having differing spectroscopic properties than do the dye precursor molecules, are placed within a same volume along with (ii) light-sensitive molecules that, when exposed to light, undergo photochemical reaction so as to form at least one of the acids, bases, ions or radicals with which the dye precursor molecules are reactive. In use as an optical memory, the dye precursor molecules are so reacted with at least one acid, base, ion or radical that is photogenerated from the light-sensitive molecules by, and in the presence of, light radiation, thereby to form the dye molecules. In simplest terms, a photochemically-induced change at and in an illuminated domain, or voxel, is causing a localized chemical reaction in the domain, or voxel, that, ultimately, produces a stable dye. The stable dye is produced at, and only at, those domains, or voxels, that are properly radiatively illuminated.

The dye precursor molecules preferably consist essentially of rhodamine B, and are more particularly rhodamine 700 laser dye reacted with potassium hydroxide. The light-sensitive molecules preferably consist essentially of aromatic ortho-nitro-aldehyde compounds as acid photo generators, and more particularly o-nitro-benzaldehyde or, most preferably, 1-nitro-2-naphaledehyde—both of which photochemicals undergo, upon excitation with ultraviolet light, phototransformation into nitroso acid.

In operation of the optical memory the dye precursor molecules—normally rhodamine base—which are held in a transparent matrix are reactive with acids, bases, ions or radicals—and in the case of rhodamine are reactive with acids—to produce dye molecules—i.e., rhodamine—having markedly different spectroscopic properties. The light-sensitive molecules—namely, the compound of ortho-nitro-aldehyde, in particular o-nitro-benzaldehyde or, preferably, 1-nitro-2-naphaledehyde—in the same matrix undergo photochemical reaction when selectively exposed to light so as to form at least one of the acids, bases, ions or radicals with which the dye precursor molecules are reactive—preferably nitroso acid. The chemical reaction of rhodamine base dye precursor molecules with photochemically produced nitroso acid within those domains that are radiatively-selected two-dimensionally, or within those voxels that are radiatively-selected three-dimensionally, by a first-frequency "write" radiation—particularly including such a "write" radiation as may be realized by two-photon absorption—produces stable rhodamine dye in the radiatively-selected domains/voxels. Subsequent illumination with a single second-frequency "read" radiation induces strong fluorescence in the dye of the written domains/voxels while leaving all chemicals/photochemicals unchanged. (The color of the dye, which goes to its index or refraction and radiation attenuation properties, is also strongly detectable. However, it is preferred to detect the read-radiation-induced flurescence.) The induced fluorescence may be imaged to a detector, such as a charge coupled device (CCD), to reliably realize a high signal-to-noise, non-degrading, radiation, or optical, memory. In accordance with the fact that the stable dye of each domain/voxel is created just once by an irreversible process, the radiation, or optical, memory is of write once, read many (WORM) type.

Neither this new combination of photochemistry and chemistry, nor this (it is believed) new type of optical memory store so realized by use of new photochemicals, are the subject of the present invention. That is, the (believed) new type of photochemical/chemical optical memory, and the (believed) new photochemicals for use in optical storage, are the inventions of persons other than the inventor of the present invention. This other invention is presently assigned to an assignee—The Regents of the University of California—other than the assignee of the present invention. However, none of this (believed) new approach has been publicly disclosed as of the date of the filing of this application. Accordingly, it is now disclosed, with permission, within this specification in support of the best mode of implementing his invention of which the inventor of the present invention is aware.

When so implemented as a photochemical/chemical process WORM memory, the preferred 3-D CD of the present invention is fully reliably operable for writing, reading and storing data entirely at room temperature, and is completely stable during all other normal environmental variations—although excessive heat and prolonged exposure to bright light are to be eschewed. Indeed, rhodamine is well known as a stable dye which fluoresces brightly over many cycles.

It will be understood by a practitioner of photochemistry, and of the design of photochemically-based optical memories, that photochemicals are still under intense widespread active development worldwide, and that the (primarily optical) principles of the present invention taught herein are fully applicable to optical media incorporating new and improved photochemicals as such becomes available in the future.

Just as photochemicals are not the basis of the present invention, neither are photonic processes, particularly including multi-photon, and still more particularly two-photon, processes. However, it is again useful to understand how, when and why an optical memory store must be radiatively illuminated for both reading and writing before proceeding to consider how the depth-transfer, doubly-telecentric afocal lens, read/write head of the present invention accomplishes this reading and writing at massive parallelism.

Two-photon ("2-P") processes for the radiation reading and writing of information transpire—for those totally unfamiliar with the concept—as follows: The preferred 2-P writing changes the state of a photochemical—more particularly the preferred nitro-naphthaldehyde is changed to nitroso acid, or, alternatively, spirobenzopyran is changed in isomeric molecular form—at selected voxels, located within the 3-D volume of the optical disk, where, and only where, the two radiation (light) beams are spatially and temporally coincident. Reading may thereafter traspire by either a 2-P or a 1-P process.

In 1-P reading—which will be found to be the preferred method of radiatively reading in the present invention—a single beam of radiation (e.g., light, and more commonly laser light) is used to illuminate a large number of voxels in common. Voxels containing chemicals that are in a one state (e.g., that have been (i) converted to rhodamine dye by chemical reaction with the nitroso acid, or that are (ii) at have assume their second, merocyanine, isomeric molecular form in the case of spirobenzopyran) produce a different response(s) to the illuminating radiation than those that are within the complimentary state (e.g., that still exist as (i) rhodamine base, or that remain in (ii) the spiropyran isomeric molecular form of spirobenzopyran). For example, the preferred phtochemicals (rhodamine base/rhodamine, or, alternatively, merocyanine/spiropyran) differ in greatly between their two states in both their (i) opacity/transmissivity and their (ii) fluorescent emission. Either of these differing responses can be used as the basis of detection of the written versus the unwritten forms. However, the bright fluorescent emissions (especially in the case of the "written" rhodamine dye) of the illuminated voxels are preferably imaged to a detector as an indication of the binary information previously radiatively stored within the voxels.

The radiation readout is substantially non-destructive—particularly for rhodamine dye. For a reversible photochemical—namely, spirobenzopyran—the written voxels may be radiatively written, including to the opposite state (i.e., erased), and re-written, read and re-read, indefinitely many times and, depending upon any fatigue of the particular photochemical(s) involved, typically thousands or tens or hundreds of thousands of times. It will be recognized by photochemists that some photochemicals such as bacteriarhodopsin have a higher operating temperature than does spirobenzopyran, but are more subject to fatigue after several tens or hundreds of erase and/or re-write cycles.

2. Theory, and Advantages, of the Present Invention

Some background to the photochemistry and chemistry of two preferred optical memory stores—one of which is believed to be wholly new—and the general requirements of their radiation(s) illumination(s) now having been discussed, explanation of the present invention now commences.

The present invention addresses a paramount challenge in building a radiation (i.e., optical) memory: how to reliably repeatedly efficiently effectively quickly acquire and image multiple voxels, especially as may be located within volumes, for radiation reading and writing. The present invention is based on the realization that a great number of information-containing voxels—each containing typically one and possibly even more bits (of differing "colors")—within each of a large number of plane segments located within the volume of an optical medium, normally an optical disk, may be imaged at (typically) massive parallelism when these imaged plane segments within the medium are tilted (i.e., angled) relative to external major planar surfaces of the optical medium (e.g., to the major planar surfaces of the optical disk).

This bears repeating: the present invention contemplates reading and writing bit planes that are tilted relative to major planar surfaces of the medium, preferably and by example the medium of an optical disk. The optical mechanism that accomplishes this—a read/write head that reads bits in and from planes that are tilted relative to, for example, the major planar surfaces of the preferred optical disk configuration and that are within the optical disk—is a most important part of the present invention. This new read-write head incorporates a "depth transfer objective" or "DTO"; more specifically and most preferably a DTO in the form of a doubly-telecentric afocal lens.

For example, the DTO of the present invention will support, by way of illustration and not by way of limitation, that some 128×128 bits (i.e., 16,384 bits) may be located in each of a very great number of tilted bit plane segments that are themselves located within the volume of, and in "supertracks" distributed annually around the circumference of, a three-dimensional optical disk, or 3-D CD. When written or read by the preferred doubly-telecentric afocal lens read/write head of the present invention, all of the bits within a single bit plane segment—i.e., the 16,384 bits—are imaged in common at the same time.

Moreover, by moving the optical medium transvesely relative to an optical read axis, successive tilted bit plane segments may be successively written, or read. Normally the optical read axis and the read/write head of the present invention remain, at least momentarily for some milliseconds or seconds, stationary in the world's reference frame while an optical disk containing the bit planes is spun underneath the read/write head. For the particular optical medium of an optical disk the tilted bit plane segments internal to the medium (the disk) collectively have the rough appearance of the angled blades of a fan, or, more precisely, a turbofan. The tilted bit plane segments are closely packed: one segment overlapping another in directions orthogonal to the major surfaces of the disk.

In accordance with the present invention, all the great many binary data bits (e.g., from 16,384 up to $10^6$+) as are associated a correspondingly great number of physical domains, or voxels, (e.g., from 16,384 up to $10^6$+voxels) located within each of a great many tilted data (or bit) plane segments (e.g., from $5×10^9$ up to $10^{10}$ such segments) internal to the optical medium are efficiently effectively reliably simultaneously imaged by the special (i) Depth Transfer Objective ("DTO") optics (ii) present within a passive optical read/write head (iii) to a conjugate image plane that is located in free space outside the outside medium.

The DTO optics preferably consist of a doubly-telecentric afocal lens-based imaging system, which system itself preferably consists of but two complimentary convex lenses (i.e., the simplest type of doubly-telecentric afocal lens system). "Doubly-telecentric" means that the imaging system is telecentric in both (i) the object space and (ii) the image space.

This doubly-telecentric afocal lens system is the basis of a read/write head which, in its location above one major surface of the disk, may be completely passive, and need not ever move at all as the disk spins beneath it. (The optical path through the preferred two complimentary convenx lens that form the preferred doubly-telecentric afocal lens system may be folded by use of a simple mirror, in which case the mirror also becomes part of the optical path of the read/write head.) A read/write head that is unmoving nonetheless serves to image many successive tilted bit plane segments that are within the disk rotating beneath the head, thereby radiatively reading, or writing, an annular band - - - called a "supertrack" - - - of a portion - - - called a "superlayer" - - - of the entire thickness of the disk. The width of the imaged annular ring, or supertrack, is not normally so wide as is the usable annular area/volume of the entire disk and is, indeed, typically but a small fraction, typically on the order of less than 1/39, of the width of the annulus. Accordingly, even should a number of annular "supertracks", say 39 such "supertracks" be present upon the 3-D CD, there will remain unused regions to the interior, and to the exterior, of the annulus of the disk - - - as is conventional.

Similarly, each imaged thickness, or superlayer, is normally much much thinner than is the thickness of the entire disk and is, indeed, typically but a small fraction, say less than 1/45, of this thickness. Accordingly, even should a number of "superlayers", say 45 such "superlayers" be centrally located within a 3-D CD, there will remain unused, unwritten and unread buffer layers at the very top, and at the very bottom, surfaces of the disk. This is distinctly oppositely to present optical disks where these surfaces are the very ones used! Clearly the read-write head, and method, of the present invention makes use of the interior volume of an optical medium, including most particularly an optical medium in the form of an optical disk.

The read/write head of the present invention may, and preferably does, move under servo control. It preferably moves transversely radially to the rotating disk in a conventional manner so that different circumferential supertracks (similar to tracks of conventional optical disks) may be sucessively accessed. The read/write head may either assume a modest number, say 39, discrete radial positions across the annulus of the disk, or it may trace a continuous spiral on the disk - - - both of which access patterns and associated servo control are just like those for existing (single bit) optical read/write heads. However, and unlike the servo control of present read/write heads, the read/write head of the present invention may additionally emply servo control of, say, ±1° in its tangential angel - - - but this is not invariably required. This servo control (i) in radial position and, optionally additionally, (ii) in tangential angle, is useful to accurately image the bit planes that are within any one supertrack.

Also unlike conventional servo control of read/write heads of presently existing optical disks, the read/write head of the present invention is preferably adjustable (in steps) to greater and lessor distance of separation from the surface of the optical disk, thereby to permit the imaging of multiple sucessive superlayers within the volume of the disk. This movement to greater and lessor proximity from the optical disk is not to be confused with the fact that a read head that is fixed in position of separation from the disk may read (or write) all the bits that are within the entire depth of all the tilted bit planes that are within the particular superlayers that is imaged. Typically some 45 superlayers, with a thin buffer zone between each superlayer, may be imaged, one superlayer layer at a time, by movement of the read/write head to some 45 corresponding "z axis" positions.

Clearly the volume of the disk, or any other optical media, can be "split up" into other and various numbers and forms of "supertracks" and "superlayers" and not just, for example, 39 supertracks in each of 45 superlayers (or, conversely, 45 superlayers in each of 38 supertracks). The present and ensuing explanation of the present invention covers possible movement of the read/write head of the invention in all three possible axis ("x", "y", and "z"), and also in one angle ("v"), substantially only so that it may be shown how simple these movements are, and how all such movements may be quite readily accomplished totally without any improvements in the accuracies, response times, or any other characteristics of servo system and servo control loop technologies already existing.

In other words, servo positioning of the read/write head of the present invention (which, it is emphasized, need not ever be servo positioned in any manner whatsoever in order to read astounding amounts of stored data) is merely expanded in the number of axis, and in one angle, in which position, and angle, are controlled, with all such servo positioning being conventionally realized.

Being that the optical read/write head of the present invention is preferably and easily moved in position (and, indeed, is so moved in one more dimension - - - z - - - than is conventional) it might be wondered why the fifth preceding, and the immediately preceding, paragraphs paused on the degenerate case of where there is no read/write head movement at all. This was because even this trivial case, which is extremely inexpensive to implement, retrieves usefully copious amounts of digital data. For example, several million bits may be stored in but 1/39 of the annulus (i.e., one supertrack), and in but 1/45 of the thickness (i.e., one superlayer), of a 2.54 centimeter (one inch) diameter 10 mm thickness optical disk.

Moreover, it will later be explained that (i) the optics of the read write head, and of some (ii) addressing beam-forming optics, all require only rough (fractional millimeter as opposed to micrometer) accuracy in their positional placement relative to the optical disk media. The component placement accuracy desired in implementation of the optical system of the present invention is more characteristic of a plastic than of a metal fixture. Therefore, and nonetheless to its prodigious data storage capacity, an optical disk system in accordance with the present invention should be thought of as being usefully built from plastic more along the lines of existing mass-market phonorecord and compact disk players than - - - despite the possible use of multi-axial servo control - - - from machined metal as would be characteristic of a Winchester magnetic disk.

Neither are the preferred lenses of the optical disk system, although preferably of optical quality, particularly precise or expensive. Admittedly, excessive wow, wobble or flutter cannot be tolerated in the optical disks and disk drive, although this normally presents no special challenge because the drive and its spindle and the optical disks are manufactured round. Permissible variations in the rotational speed of the optical disk are much broader than those normally encountered, and such variations as do occur are readily encompassed by encoding the read clock in the read data. (The write clock is normally controlled from a conventional crystal oscillator).

The detector array for the system of the present invention is not yet commercially available in the most preferred technology (active pixel sensors) at the most preferred sizes (about 4 cm$^2$) having highest sensitivity at the most-preferred light wavelengths (500–1000 nm). However, existing simple, inexpensive and readily available arrays of Charge Coupled Devices (CCDs) serve adequately as detectors.

Read illumination is preferably accomplished by inexpensive laser diodes. Write illumination (for units that write) is somewhat more expensive, requiring a low power laser.

Therefore, and although the preferred photochemistry/chemistry of the memory store might be considered sophisticated, no optical nor disk drive system components, nor any system control, hereinafter discussed should be though or suspected to be any more complex than will be candidly admitted. Instead, an optical engineer will come to recognize that most, if not all, of the optical disk system of the present invention may be tolerably implemented with only such accuracies (as must ultimately suffice to read and write a bit domain of a chosen size and volume), and with only such components, as are quite generally and readily, and even easily, obtainable. In this manner the present invention is hopefully somewhat different from the optical memories of the prior art that, while often projecting prodigious storage capacities, have often seemed to fail to teach an apparatus that is practically, or at least econmically, realizable.

Returning to the imaging performed by the read/write head of the present invention (whether, and wheresover, moved in three-dimensional spatial position, and also in angle tangential to the supertrack), the conjugate image plane imaged by the read/write head is, just like the data plane segment, tilted. In its position outside the disk this conjugate image plane is, in fact, angled complimentary to the data plane segment that is within the volume of the optical medium. In other words, the image plane located in free space on one side of the DTO optics is conjugate, and complimentary, to the data plane segment that is embedded within the optical medium on the other side of the DTO optics. An optical sensor array may be, and most often is, located directly in the conjugate image plane.

Because the optical path of the image may readily be variously folded and directed, with the image being rotated or expanded or compacted - - - all in accordance with the principles of optics - - - as is desired, the optical path of the image preferably is so folded for ease of component location and access, and for compactness of packaging. In a most preferred configuration of the 3-D CD, after the image (of an entire tilted data plane segment within the volume of the disk) passes though a first convex lens of the preferred doubly-telecentric afocal imaging system, this image impinges upon a simple plane mirror set at a 45° angle, and is then re-directed parallel to the disk. The re-directed image then passes (i) through the second convex lens of the preferred doubly-telecentric afocal imaging system and (ii) onto an optical sensor array located in the angled conjugate plane. This sensor array is thus, nonetheless its location, still at the optical location of the conjugate image plane. The sensor array - - - which deals with the image in the conjugate image plane - - - takes the form of (i) an array of selectively masked optical emitters for writing the optical disk, or (ii) an optical detector array for reading the optical disk.

Imaging of successive internal data plane segments within a rotating optical disk is totally without large-stroke physical motion, nor any need to reacquire tracking, focus or synchronization. Acquisition of all the data from all the pixels, or voxels, located in each (tilted) data plane segment is simultaneous, and in parallel. As stated, the "parallel" optical readout head is preferably controllable to move radially across the annulus of the spinning optical disk in a conventional manner. It may so move between successive concentric circular tracks, as is typical of a magnetic Winchester disk, making that the data within the optical disk will then be read out at constant angular velocity (CAV).

Alternatively, it may so move in a spiral track at a constant linear velocity (CLV), as is typical of an conventional Compact Disk (CD). Finally, it may so move between successive spiral track segments in a zoned constant angular velocity (ZCAV) - - - which is another contemporary, but little-used, standard for CD's.

It should be noted that the existing, prior art, standard for DVD's incorporates each of CAV, CLV and ZCAV - - - although it is uncertain that any one DVD player-recorder will function in multiple formats. The 3-D CD system of the present invention can work with any, and all, of the CAV, CLV and ZCAV formats. Indeed, because the optical readout head of the present invention need generally be moved no faster, nor any more uniformly, nor any more accurately - - - and possibly not even so precisely if correction of any mis-registration to the supertrack is performed electronically - - - than is typically presently required in order to track a single "line" of bits. A single 3-D CD unit of the present invention is able, under appropriate electronic control, to variously read and write in a manner similar to any of CAV, CLV and ZCAV - - - each of which standards has strengths for certain applications.

Moreover, at least the prior art method of CAV suffers in that the size of the domains in which data is impressed are larger at the periphery of the disk, and smaller near its central annulus. The 3-D CD of the present invention optionally preferably employs multiple "supertracks". (Multiple supertracks are "optional" only because it is possible to implement an optical disk having a quite impressive storage capacity with but one only supertrack). One supertrack at a time is imaged by moving with under servo control the optical read/write head, and the Depth Transfer Objective (DTO) optics of the read/write head, into position over the supertrack. The "supertracks" readily permit that the tilted bit planes located in a circumferential band at the periphery of the disk are commensurately greater in number than are the number of tilted bit planes within an interior annular band. For example, consider if each bit plane is "scanned" or "detected" at an approximately equal rate - - - meaning that it was originally written in accordance with a standard clock and that it is subsequently read at rates as may be determined by a Manchester-type code present within the stored data. Clearly there will be more bit planes in the outer supertracks, and fewer bit planes in the inner supertracks. Accordingly, not only is the substantial annular volume of the optical disk filled with data, it is so filled at substantially the same (high) density.

Moreover, there may be, and preferably are, multiple vertical layers - - - superlayers - - - within a single disk. Access to each superlayer, and to all the supertracks of the layer, occurs by servo-positioning the optical read/write head, and the Depth Transfer Objective (DTO) optics that comprise the head, to a greater or a lessor separation from the disk. At least one, and sometimes two, illuminating beams as may in part pass through optics other than the read/write head are necessary to read and to write the disk. These beams may also be adjusted in position by servos - - - but this is not normally necessary if each of the beam positions, angles and dispersions are carefully considered! In two different orientations of these read/write beams that are called "co-linear" and "confocal-theta" one beam - - - the sole and only illuminating beam needed to read the disk - - - will be seen to track with the read/write head, and will thus always be accurately positioned. In a final, third, read/write beam orientation called "orthogonal", a one illuminating beam illuminates the bit plane through the edge of the (rotating) disk, and again need not be moved in position.

The (i) entire general concept of moving optical elements by use of servo motors, and more particulary (ii) the moving of an optical read/write head to selected tracks, and, less commonly, to selected separation from the optical disk, is readily, and routinely, implementable. It needs only be considered in assessing the present invention as to whether the servoed motions required are required to be more accurate, or over a wider range, or faster, or more frequent, etc., than heretofore. In other words, the claimed performance of the present invention (hereinafter set forth) should not be surreptitiously dependent upon some futuristic servo and/or servo control technology unless this dependence is specifically acknowledge, and unless this new and superior servo control technology explicitly taught.

In fact, the present invention works quite well with existing servo, and servo control, technologies, and is not particularly demanding of either. In fact, the present invention is arguably very "easy" on required servo technology, and on the required servoed movement of the read/write head. This is because every location of the read/write head brings in some large multiple more information - - - typically thousands of times more information for each (super) track position by millions of times more information for such a fractional millimeter repositioning in the z axis as permits an entire new superlayer to be accessed - - - than heretofore. Commensurately with the vast amount of data recoverable from each supertrack, and each superlayer, the read/write head is typically moved more infrequently, and more leisurely. Finally, the preferred optics of the invention are preferably of such long focal length, and preferably correct for diffraction, so as to commensurately ease the required exactitude of read/write head positioning.

Furthermore, if several terabits of information storage per 13.3 cm (5¼ inch) disk (hereafter discussed) proves insufficient, then one possible route for improving the present invention until information should ultimately be stored in domains/voxels the size/volume of a few molecules already exists. Namely, the present invention holds the future promise of permitting focusing, deskewing, tracking, and/or error-correcting by electronic and/or holographic image recognition and renormalization. When you must access one small bit domain at a time, as with present optical disks, then it absolutely must be done accurately. If the bit is "missed", then no data at all is recovered. This accuracy requirement typically consumes about one-half the total usable area of a conventional optical disk. However, if you can access a million bits at a time as with the present invention, not only do the densities and data transfer rates, and the efficiencies of data storage and retrieval, increase greatly, but so do the efficiencies of error correction. It is impossible to error correct one bit when one bit is read; it is not so hard to error correct a million bits when a million bits are read. This relationship has been poorly understood because, until the present invention, optical parallel data storage systems have not realized such commanding performance as has previously caused all aspects of their performance to be critically regarded. The performance aspects of the present invention will be discussed further at a later point in this specification.

In the meanwhile, it should be considered that the 3-D CD system of the present invention where a single optical read/write head typically reads (i) many "bands" or "tracks" wide (i.e., "supertracks") and (ii) many "layers" deep (i.e., "superlayers") not only usefully retrieves great amounts of information per unit time (see section 6. below), but exhibits "low focal latency". Even when the read/write head can move in one or, as is both typical and preferred, in two axis (i.e., both radially across the disk, and in separation therefrom), it often need not so move in order to access all the data which many computer applications require! In other words, although computer programs have managed to balloon from a few kilobytes to multiple megabyte size in but a few short decades, and although speech and video processing requirements still loom large on the computing horizon, there is some question whether programs, especially for personal computers, can continue present growth rates and balloon to multiple hundreds and thousands of megabytes (gigabytes) in size without employing a substantial portion of the earth's population as programmers. Accordingly, if one "supertrack" of a 3-D CD of the present invention is capable of storing several gigabits of read/writeable information (which it is, see below), then this may be all that is required for one program and its related databases, and the read/write head may not have to move at all for a full day's computer accesses!.

3. A Depth Transfer Objective Lens Imaging System for an Optical Disk

Therefore, in one of its aspects the present invention is embodied in a head for an optical disk. The head may be a read head, a write head, or, as is preferred, both a read head and a write head.

The head includes a depth transfer objective imaging system. This system images (i) voxels substantially in a plane segment located completely within the medium and tilted relative to the medium's planar surface to (ii) another, conjugate, plane segment, likewise tilted relative to the medium's planar surface and located outside of the volume of the medium.

The head is typically used with an optical disk having parallel planar major surfaces, or sides. The depth transfer objective imaging system is preferably a doubly-telecentric afocal lens imaging system. Such an imaging system used with an optical disk serves to image (i) voxels substantially in a plane segment tilted relative to the major planar surfaces of the disk, located along a chord or a radius of the disk and within the volume of the disk, to (ii) another, conjugate, plane segment, likewise tilted relative to the major planar surfaces of the disk, located completely outside of the volume of the disk. The chief rays to all image points are almost parallel to the optical axis (for ideal lenses they are parallel). The imaging system called "doubly-telecentric" because it is telecentric both (i) in an object space and (ii) in an image space. A detector array, onto which images of the voxels are received, may be directly located in the conjugate plane. If so located then it may be about the same physical size as is the imaged plane segment of voxels within the disk, meaning that this plane segment of voxels within the volume of the disk has been imaged by the doubly-telecentric afocal lens imaging system without magnification. Normally in this case the doubly telecentric afocal imaging system is symmetric, with the detector array being located about the same optical distance in one direction along the optical path from the doubly-telecentric afocal lenses as the plane of voxels within the volume of the disk is located in the opposite direction along the optical path. (But, by the principles of optics and of lenses this is not required.)

Alternatively, the detector array may be larger than the plane segment of voxels within the disk. In this case the conjugate plane segment is imaged by the doubly-telecentric afocal lens imaging system at a larger size than is the plane segment of voxels within the volume of the disk; the imaging of the voxels having been with magnification. Normally in this case the detector array is at a greater optical distance along the optical path in one direction from the doubly-telecentric afocal lens imaging system than is the plane segment of voxels within the volume of the disk in the opposite direction along the optical path. Again, however, in accordance with the principles of optics and of lenses, this is not absolutely required.

The detector array in the conjugate plane segment is typically either a charge coupled device or, preferably, an active pixel sensor.

In use of the doubly-telecentric afocal lens imaging system as an optical disk read head a source of illumination for illuminating the voxels within the image plane segment is required. This illumination source can be located an any of at least three separate locations.

The illumination source is preferably located in the plane of the optical disk. It there serves to radiatively illuminate a planar radial cross-section, tilted relative to the plane of the optical disk, across the entire annulus of the optical disk. The illuminated planar radial cross-section contains the plane segment of the imaged voxels. This illumination is called orthogonal because, being in the plane of the disk, it is at a right angle to an optical, imaging, axis of the doubly-telecentric afocal imaging system.

Alternatively, the illumination source may be located to the side of the plane of the optical disk. So located it serves to radiatively illuminate a planar radial cross-section, tilted relative to the plane of the optical disk, containing the plane segment of the voxels. This illumination is called "confocal-theta" because, being on the side of the plane of the disk as is the doubly-telecentric afocal imaging system, it makes an angle theta with the optical axis of this doubly-telecentric afocal imaging system in a manner similar to confocal-theta microscopy.

Still further alternatively, a source of illumination radiation may be channeled through a beamsplitter in the optical path of the doubly-telecentric afocal imaging system and of the source of illumination radiation, thereby becoming directed onto the plane segment of the imaged voxels. This illumination is called collinear because it is in part along a same optical axis as is the imaging of the doubly-telecentric afocal imaging system.

In each and every case the illumination is sufficient, and sufficiently selective, to cause, of what voxels are within the field of view of the doubly-telecentric afocal imaging system, that all, and only, those voxels that are within the image plane segment will be radiatively illuminated, and will produce a detectable image at the conjugate plane, while all illuminated voxels outside this plane segment (if any are so illuminated) will not be so imaged as anything detectable in the conjugate plane. In other words, although more voxels than those that are within the plane segment may be illuminated, only those voxels that within the plane segment will be imaged to the detector array, and no other illuminated voxels, fluorescent emissions from which might cause optical noise, will be so imaged to the detector array.

When the doubly-telecentric afocal lens imaging system is used as an optical disk write head to write the optical disk then the illuminator is still involved. It is preferably located in the plane of the optical disk - - - the first alternative above. Recall that the illuminator in this location served to radiatively illuminate with a planar radial cross-section, tilted relative to the plane of the optical disk, across the entire annulus of the optical disk. The plane segment of the voxels is a part of this planar radial cross-section. Clearly then this illuminator does nothing as regards selective writing of the voxels by process of two-photon absorption; serving even to illuminate more voxels than are within the place segment. The illuminator in the plane of the optical disk simply supplies one of the two illumination beams required for two-photon absorption.

Meanwhile, a masked second illuminator, located in the conjugate plane, radiatively selectively illuminates with a second frequency radiation through the doubly-telecentric afocal imaging system selective voxels within the plane of voxels. In accordance with the known principles of writing a photochemical medium by process of two-photon absorption, the spatially and temporally coincident illumination with both illumination beams of certain selected voxels with the plane segment (which is tilted relative to the plane of the optical disk and located within the volume of the optical disk) causes a photochemical that is within these selected voxels of this plane segment to undergo a stable change. This stable change is, however, reversible - - - again by two-photon absorption now with the two illumination beams one of which (typically the first illuminator) is now of a different frequency. In other words, the information written by two-photon absorption can be erased by the same means alternatively applied. Importantly, during both two-photon writing and two-photon erasing only the selected voxels, and none are changed elsewhere within the volume of the optical disk.

The same phenomena holds upon reading. Even radiation in the form of fluorescent emissions induced in the photochemical that is within a one state (within such domains as it is in this state) does not combine with the (single) read illumination beam to cause changes anywhere within the optical media.

Accordingly, reading is with one radiation beam. Writing is with two radiation beams. Reading is non-destructive read-out. Importantly, and in accordance with the principles of two-photon absorption, both the reading and the writing processes are very substantially clean, meaning that no appreciable degradation occurs to any voxels during reading, nor to any and all voxels not specifically written during writing.

It might be wondered if the 3-D CD would work - - - at least as a read/writeable memory in not also as a re-readable/re-writeable memory - - - if the writing were not two-photon. For example, might it be possible to perform hole burning or effect other transformations at depth within an optical material! According to the many prior art patents of Swainson, et al. for three-dimensional optical memories, it is so possible. However, as the domains get smaller, and the read/write speeds higher, the "clean" radiation processes of the present invention are highly preferred.

4. A Method of Reading and Writing an Optical Disk with a Doubly-telecentric Afocal Lens Imaging System In a similar aspect the present invention is also embodied in a method of reading an optical disk.

Voxels within a plane segment of an optical disk, which plane segment is (i) within the volume of the optical disk and (ii) tilted relative to the major planar surfaces of the optical disk, are selectively illuminated.

The illuminated voxels are imaged with a doubly-telecentric afocal lens imaging system (i) the voxels in the plane segment that is tilted relative to the major planar surfaces of the disk being imaged to (ii) another, conjugate, image, plane - - - likewise tilted relative to the major planar surfaces of the disk - - - that is located outside of the volume of the disk.

A detector array is optically communicative with this conjugate image plane. The detector array may simply be located at the conjugate image plane. In accordance with the principles of optics, and of lenses, the detector array may be closer (and smaller) than the conjugate image plane or, more commonly, farther away and larger so as to receive from the doubly-telecentric afocal lens imaging system a magnified image.

The optical path between the imaged plane segment and the conjugate image plane may be folded. It may be so folded by a simple flat mirror located between the two lenses of the doubly telecentric afocal imaging. The mirror serves to reflect the image 45° so as to be parallel with the surface of the optical disk and so as to, after passing through the second of the two lenses, intercept the detector array in a conjugate plane that is now located immediately above the disk. The detector array detects the optical properties of the imaged illuminated voxels as an indication of information stored in the voxels.

Typically (but not invariably), the illuminating causes any such ones of the illuminated voxels as are in a particular one of two stable states to fluoresce, and it is this imaged fluorescence that is detected with the detector array as the indication of information stored in the voxels. (Voxels not in this particular one state do not fluoresce when illuminated.)

As with the first aspect of the invention, the illuminating may be (i) orthogonal, (ii) confocal-theta, or (iii) collinear. p The method of writing the optical disk is similar. A planar radial cross-section, tilted relative to the plane of the optical disk and containing a multiplicity of voxels, is radiatively first-illuminated. The first-illumination is normally with first-frequency radiation from a first illumination source.

A masked second illumination source either at, or, more commonly optically transmitted through, the conjugates image plane is further optically communicated through the doubly-telecentric afocal imaging system, therein illuminating selected voxels with within the plane segment. The second illumination, and illumination source, is normally with a second-frequency radiation.

The first-illuminating and the masked second-illuminating serve to jointly radiatively illuminate selected voxels within the plane segment (which is tilted relative to the plane of the optical disk and located within the volume of the optical disk). The spatially and temporally coincident first-frequency and second-frequency radiations are sufficient to; and serve to, stably change a photochemical within the voxels of this segment, and not elsewhere within the volume of the optical disk.

In one, less preferred, embodiment of the invention the photochemical may be radiatively reversed in state; what is written can be oppositely written, or erased. Accordingly, in this embodiment the optical disk is written, re-written and/or erased within its three-dimensional volume only in the locations of the selected voxels, and not elsewhere. Radiative reading is without effect on the written information, or those portions of the memory not yet written.

In another, preferred, embodiment of the invention the photochemical is changed to and acid, and locally undergoes a chemical reaction with a dye precursor chemical to form a dye. This reaction is irreversible, and what is written cannot be oppositely written, or erased. In this embodiment also the optical disk is written within its three-dimensional volume only in the locations of the selected voxels, and not elsewhere. Radiative reading is again without effect on the written information, or those portions of the memory not yet written.

5. A Radiation Memory

In yet another of its aspects the present invention is embodied in a memory system for the parallel writing by process of two-photon radiation absorption, and the parallel reading (with single beam illumination), of data stored in a large number of voxels out of a very large number of voxels all located within the three-dimensional volume of an optical medium, normally an optical disk.

The radiation memory is based on a doubly-telecentric afocal imaging system. As previously explained, "doubly-telecentric" means that the imaging system is telecentric both in an object space and in an image space. The imaging system is adjacent the planar surface of the three-dimensional body so that it serves to image a large number of voxels that are within a plane segment that is both (i) within the body and (ii) tilted relative to the body's planar surface. These voxels are imaged at a constant magnification over a finite lateral extent across, and throughout a finite depth of, the tilted plane segment within the body. These voxels are so imaged to a conjugate; tilted, image plane segment located outside the three-dimensional body. The voxels contain information susceptible of being sensed by radiation, and the image of the voxels conveys this information.

For writing of the voxels, the system has both first and second sources of radiation illumination. These sources cooperated during writing of the memory store so that (i) the first radiation source first-radiates with a first beam of radiation all the multiplicity of voxels that are within the tilted plane segment meanwhile that (ii) the second radiation source simultaneously second-radiates with a second beam of radiation at least selected ones of the large number of voxels that are within the tilted plane segment. The simultaneous radiation, when and where occurring, changes a photochemical within the selected voxels by process of two-photon absorption.

In one, preferred, embodiment the photochemical (a compound of ortho-nitro-aldehyde) changes into an acid (nitroso acid), which undergoes a chemical reaction with a dye base (rhodamine B) proximately co-located within the matrix so as to turn into a stable dye (rhodamine). In a less preferred embodiment, the photochemical (spirobenzopyran) changes in isomeric molecular form.

Howsoever in detail accomplished - - - and still other mechanization are possible such as those taught within the prior art patents of Swainson, et al. (op. cit.) - - - the optical properties of the selected voxels are changed. (In accordance with the principles of two-photon absorption, voxels not simultaneously radiated by both radiation sources do nothing, and, most important, suffer no change in their optical properties.)

Only one radiation source is required for reading of the optical medium. It is typically one of the two, and more typically the first one of the two, illumination sources that are otherwise used for writing. In other words, writing is with two illumination sources but reading is with but one illumination source. During reading all the voxels that are within the tilted plane are illuminated with (the single beam of illuminating) radiation, causing those selected ones of the voxels previously written (by process of two-photon absorption) to respond in an optically distinguishably different manner than the voxels not so written.

It has been stressed that, in accordance with the selective response of the contained photochemical to illumination radiation, during (two-photon) radiation writing of the optical medium all voxels not radiatively illuminated and/or not in a previously written state do nothing. Most importantly, they do not contribute to noise. So also, it is stressed that no voxels anywhere change their optical properties (as if they were being written, or erased), during the process of (one-photon) reading. This includes the very voxels radiatively read: reading is completely non-destructive.

This is very important. A preferred optical memory in accordance with the present invention does not wear out in the sense that it becomes "gray". Depending upon the photochemical, the optical memory may be good for only a limited number (typically hundreds or thousands or millions) of write cycles (or of read-write cycles), and the fluorescence from the photochemical may grow dimmer with age, use or high temperature. However, unwritten voxels do not start to assume the properties of the written voxels. Does this make any difference! It is somehow better to degrade by becoming "dimmer" as opposed to "grayer"? The answer is "yes". Weak fluorescent emissions can always be compensated for by optical gain, by gain in the optoelectronic detectors, and/or by a longer read dwell time. But when the stored information becomes indistinguishable in its two forms, the memory is worthless. The photochemistry/chemistry of the preferred embodiment memory of the present invention is not presently believed to suffer any such limitations as would affect its use in the tasks to which computer memory stores are normally employed (circa 1998).

During reading a detector array is optically communicative with the conjugate, tilted, image plane. The detector array is most commonly actually located right at, and in, the image plane (in which case the image plane is also the detection plane). In accordance with the principles of optics and of lenses, the detector array may, however, be located closer or further away.

The optical path to the detector array may also include one or more mirrors, or even lenses, in accordance with well-understood optical principles of directing and/or scaling and/or rotating a light beam.

The detector array optically detects - - - all at once and in parallel during reading - - - the optically distinguishably different responses of all the data as is stored in all the voxels within the tilted plane. These responses are, of course, collectively simultaneously imaged to the detector by the doubly-telecentric afocal imaging system. The detected responses are an indication of the data previously written in the voxels that are within the tilted plane—which plane is, of course, within the three-dimensional body of, typically, the optical disk.

Accordingly, data is simultaneously written, or read, in parallel from a large number of voxels that are within the three-dimensional volume of an optical body. The data is so read by but one single radiation beam. However, the data is recorded by two radiation beams.

The voxels of the plane segments in which the data is optically addressably recorded within, or read from, one or more photochemicals are defined by the reading, or, more exactly, the writing optics. A virgin volume optical memory is delivered into service as a continuum of photochemical(s) within a stable matrix—meaning that there is no internal metric of any type. The voxels dimensions and voxel locations are subsequently defined by the optics in conjunction with the arrayed encoders and detectors.

Clearly the writing optics write must voxels in three-dimensional positions, if not also of the same size, as may be suitably imaged by the reading optics. Seemingly, given the minute size of the voxels, dimensional registration and alignment would be a great challenge, a challenge at least on the order of a Winchester type magnetic disk. This is not the case. Basically the voxel locations are not highly rigidly defined—not when written, nor relative to one another when read, nor even from time to time as re-written, but are instead relative substantially only to each other.

A remotely analogous concept are the soft sectors, as opposed to hard sectors, of magnetic disks. However, the flexible definition of the soft sectors of a magnetic disk does nothing as regards the (i) data within a sector, nor (ii) the positions of the tracks. Because (i) the optical read/write head takes a large, multi-voxel image off the optical disk (or impresses such an image onto the optical disk), it will be understood that, because the basic spatial relationship between pixels is defined by the write masking and write optics during writing, the written pixels can be quite easily read if any mis-registration in the image(s) can be tolerated.

How big is this "if"? It is not very big. If the registration of just three pixel pixels can be located in x, y and z, much in the manner that present optical disks focus in x and y, then this registration can be extended to thousands, and tens and hundreds of thousands, and even millions, of related pixels. (If rotation in the plane is not an issue, as is normal, the position of only two bits need be known!) Moreover, pixels in later-written files need not exactly align with pixels in first-written files if there is some capability, and adequate time, to electronically signal process and interpret collective pixel images that may have slightly different registration.

In accordance with the present invention, there is this capability. It is based on (i) fast optical detectors, such as active pixel sensors or CCD's, and (ii) fast digital logic that, considerable as the data read rate of the present invention may be, are still capable of timely applying an offset, or a correction, (iii) in accordance with well-established image processing algorithms, to entire "frames" of images (which "frames" come off the disk in accordance with its rotation rate). In other words, the positional registration of every single voxel image/data bit need not be corrected for nor compensated either (i) mechanically, nor (ii) electronically computationally algorithmically, just entire "page images" of, typically, several thousands or tens or hundreds of thousands of data bits at a time.

In section 1 of this SUMMARY OF THE INVENTION section, it was explained that tracking of the optical read/write head was efficient because once the read/write head was properly positioned for one bit at coordinates x,y then it was, proper x-y skew angle being set, at the proper position to read many thousands, or tens and hundreds of thousands of bits. Now it has just been discussed that, if an image can be corrected for three bits than it can typically be efficiently corrected for thousands, or tens and hundreds of thousands, of bits at the same time.

This is exceedingly useful. The (i) rigid positioning, and (ii) error correction, limitations of magnetic, and prior optical, disks are broadly and substantially overcome—even while storage density goes up! This does not mean that the read/write head must not be accurately positioned, and that error correction is unnecessary; it only means that once these functions are performed as currently, and certain slight other factors (related to image angular skew) are taken account of, then large performance gains may be registered with use of what are substantially already existing (i) tracking devices and (ii) error correction methods.

This sounds too good to be true. Certainly an optical read-write head cannot be simply "hung to the side" of a rotating disk at current standards of positioning and imaging accuracy and retrieve thousands, and tens and hundreds of thousands, of bits at one time, or can it? It is true in the present invention—but largely only because dimensional control challenges have been, by subtle design choices, excluded from negatively affecting the z imaging axis. Certain design choices in the preferred 3-D CD optical memory of the present invention—choices mostly involving the focal lengths of lenses—preclude and exclude that positional control and error correction problems should bedevil the problem of locating the read/write head in the z axis. In other words, in order to read a single "superlayer"—which is often a quite reasonable choice—the read/write head does not require the same control in the z axis that, howsoever conventionally, it requires in the x and the y axis. The z axis servo control system, is still needed, however it may be even less accurate than the x-y servo. Moreover, lack of z axis sensitivity helps to ensure robust and reliable performance of the 3-D CD under shock, vibration and multitudinous other variations, changes and differences. The particular design choices leading to the z-axis insensitivity will be discussed in the DESCRIPTION OF THE PREFERRED EMBODIMENT section of this specification.

Note also that the voxels which are located within the three-dimensional volume of the disk are substantially located in planes that are (i) tilted relative to the major planar surfaces of the disk and (ii) located along a chord or a radium within an annulus of the disk. The collective planes thus have the substantial form of the blades of a turbine or turbofan, or of a gas compressor. This structure therefore leads us to the next section, where it is noted that an written optical disk in accordance with the present invention has a unique form.

6. An Optical Disk

Therefore, in yet another of its aspects the present invention will be recognized to be embodied in an optical disk of particular characteristics. The optical disk is characterized in that information is optically recorded within a chemical or a photochemical within addressable voxels located within the three-dimensional volume of the disk. Moreover, these voxels are located substantially in plane segments that are (i) tilted relative to the major planar surfaces of the disk and (ii) located along a chord or a radius within an annulus of the disk. The collective plane segments have the substantial form of the blades of a turbine. They are overlapping, meaning that an imaginary line through the disk perpendicular to its major surfaces will intersect multiple plane segments.

The chemical or photochemical induced to undergo a stable change, preferably by process of two-photon absorption. Thus information is optically radiatively recorded, preferably by process of two-photon absorption.

Normally the information is optically radiatively recorded at least one particular wavelength, and the addressable voxels are preferably optically defined to be at or near the diffraction-limited spot size relative to this at least one wavelength. In other words, the voxels are exceedingly small. As is also determined by the optics, the voxels exceedingly dense, being separated by a distance on the order of their own dimension.

In order to be so small, the changes radiatively effected in the minute voxels must be strongly readily detectable. The preferred chemicals or photochemicals fluoresce brightly in their written form, and, with the high sensitivity of modern light detectors (which, in forms used in astronomy can detect a single photon), the many molecules that are within a domain of diffraction-limited size, and the corresponding fluorescent emission from these many molecules, more than suffice for adequate signal-to noise for detection.

7. Details of the Preferred Optical Disk Radiation Memory

Therefore, and returning to the radiation memory aspects of the present invention, the present invention will be recognized to be embodied, in the detail of its preferred implementation, in a radiation memory store in the form of an annular optical disk. The disk contains within its volume one or more photochemicals and chemicals suitably written by process of two-photon absorption to change from a first to a second stable state, and suitably read by process of single beam illumination (or by the more complex two-photon absorption!) to produce a different optical output dependent upon which of the two stable states is presently assumed.

During reading, a first illuminator is preferably located in the plane of the optical disk, and serves to radiatively illuminating with a first-frequency radiation of a planar radial cross-section, tilted relative to the plane of the optical disk, across the entire annulus of the optical disk.

A planar matrix of radiation detectors is located to one side of and tilted relative to the plane of the optical disk so as to form a conjugate plane to the illuminated plane segment within the plane of the optical disk. The detectors of this matrix individually detect incident radiation.

A doubly-telecentric afocal imaging system, located on the side of the optical disk between the optical disk and the radiation detectors, images the illuminated plane segment, and the photochemical therein, onto the planar matrix of radiation detectors.

By this coaction the imaging and the matrix of radiation detectors jointly serve to define arrays voxels, meaning volumes of information storage, within the photochemical that is within the illuminated plane segment that is within the volume of the optical disk. (This photochemical within the volume of the disk is as a continuum without distinction or differentiation or boundary at times before the optical disk is first written.)

An electronic signal processing and data recovery means interprets the incident radiation individually detected at all the matrix of radiation detectors as being the binary data content of the arrayed voxels of such plane segment of the disk as has been radiatively illuminated by process of two-photo absorption.

A motor serves to rotate the optical disk relative to the first illuminator, the second illuminator, the planar matrix of radiation detectors, and the doubly-telecentric afocal imaging system so that successive volumes of the optical disk, and of its photochemical(s) and/or chemical(s), serve as the illuminated plane segment, making that binary data content may be radiatively read from a 360° annular ring, or band, or "supertrack", of the optical disk.

A optional tracking means serves to move the second illuminator, the planar matrix of radiation detectors, and the doubly-telecentric afocal imaging system radially across the rotating optical disk so that successive adjacent volumetric annular bands, or supertracks, of the optical disk may be read, ultimately permitting that data may be radiatively read from substantially the entire annulus of the optical disk.

During writing the detector array is replaced by a masked array of second illuminators. These second illuminators serve to radiatively illuminate—with a second frequency radiation transmitted through the doubly-telecentric afocal imaging system—a portion of the planar radial cross-section, tilted relative to the plane of the optical disk, that is also illuminated by the first illuminator. The first and the second illuminator jointly radiatively illuminate a plane segment, tilted relative to the plane of the optical disk and located within the volume of the optical disk, with spatially and temporally coincident first and second frequency radiations sufficient to write, or read, as the case may be, the photochemical within selected voxels of this plane segment, and—importantly—not elsewhere within the volume of the optical disk.

8. Performance of a Three-Dimensional Compact Disk (3-D CD) in Accordance with the Invention A more detailed showing of the parameters and the performance of a present, and of a prospective, three-dimensional compact disk (3-D CD) in accordance with the invention is contained in section 5 of the DESCRIPTION OF THE PREFERRED EMBODIMENT of this specification. That showing follows as long discussion in section 4 of the DESCRIPTION OF THE PREFERRED EMBODIMENT of this specification as to why the present invention is able to achieve its rather awesome performance without requiring that the performance of present tracking and imaging methods and components be transcended, and, indeed, while permitting that the precision, accuracy and time responsiveness of these existing optical disk components and control systems need not be improved upon over present norms.

Accordingly, such a three-dimensional compact disk (3-D CD) in accordance with the present invention as may actually be realized circa 1998, and such a 3-D CD as might prospectively be realized with present technologies, have the following parameters and performances:

|  | Present "1" 3-D CD | Prospective "5 1/4" 3-D CD |
|---|---|---|
| Disk Physical Parameters | | |
| disk diameter (inches) | 1 | 5.25 |
| disk diameter (cm) | 2.54 | 13.3 |
| outer annular radius ($\mu$m) | 12,500 | 60,000 |
| inner annular radius ($\mu$m) | 2,500 | 20,000 |
| usable annular area ($\mu m^2$) | 471,238,500 | 10,053,088,000 |
| disk thickness ($\mu$m) | 6000 | 10000 |
| pi ($\pi$) | 3.14159 | 3.14159 |
| useful volume ($\mu m^3$) | $2.83 \times 10^{12}$ | $1.00531 \times 10^{14}$ |
| rotation rate | 1200 rpm | 1500 rpm |
| Domain (Voxel) Parameters | | |
| bit-lateral dimension ($\mu$m) | 2 | 1 |
| bit-plane thickness ($\mu$m) | 30 | 10 |
| bit volume ($\mu m^3$) | 120 | 10 |
| bits per mark (3D) | 2 | 8 |
| Chemical Parameters | | |
| preferred photochemicals | | |
| Write Once Read Many (WORM) | nitro-naphthaldehyde | nitro-napthaldehyde |
| Erasable | spirobenzopyran | spirobenzopyran |
| preferred matrix | polymer plastic | polymer plastic |
| Capacity/Optical Parameters | | |
| raw capacity (GB) | 5.89 | 10053.09 |
| user capacity (GB, 50% OH) | 2.95 | 5026.54 |
| page size -x | 128 | 1000 |
| page size -y | 128 | 1000 |
| plane tilt angle (°) | 45 | 45 |

Expanded explanation of the origin, and significance, of these parameters is given in the DESCRIPTION OF THE PREFERRED EMBODIMENT portion of this specification.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow:

FIG. 1b is a diagrammatic perspective view showing the manner in which one of two beams of radiation is masked to write by process of two-photon absorption a selected bit plane within the volume of an optical memory.

FIG. 15, consisting of FIGS. 15a through 15c, show the three different addressing illumination schemes of the present invention: orthogonal, confocal-theta, and co-linear.

DESCRIPTION OF THE PREFERRED EMBODIMENT

Although specific embodiments of the invention will now be described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

1. Recapitulation of the Challenges to Reading and Writing Bit Planes in a Volume Optical Memory In one of its aspects the present invention is embodied in a depth transfer objective for parallel information transfer.

Figure 1A:
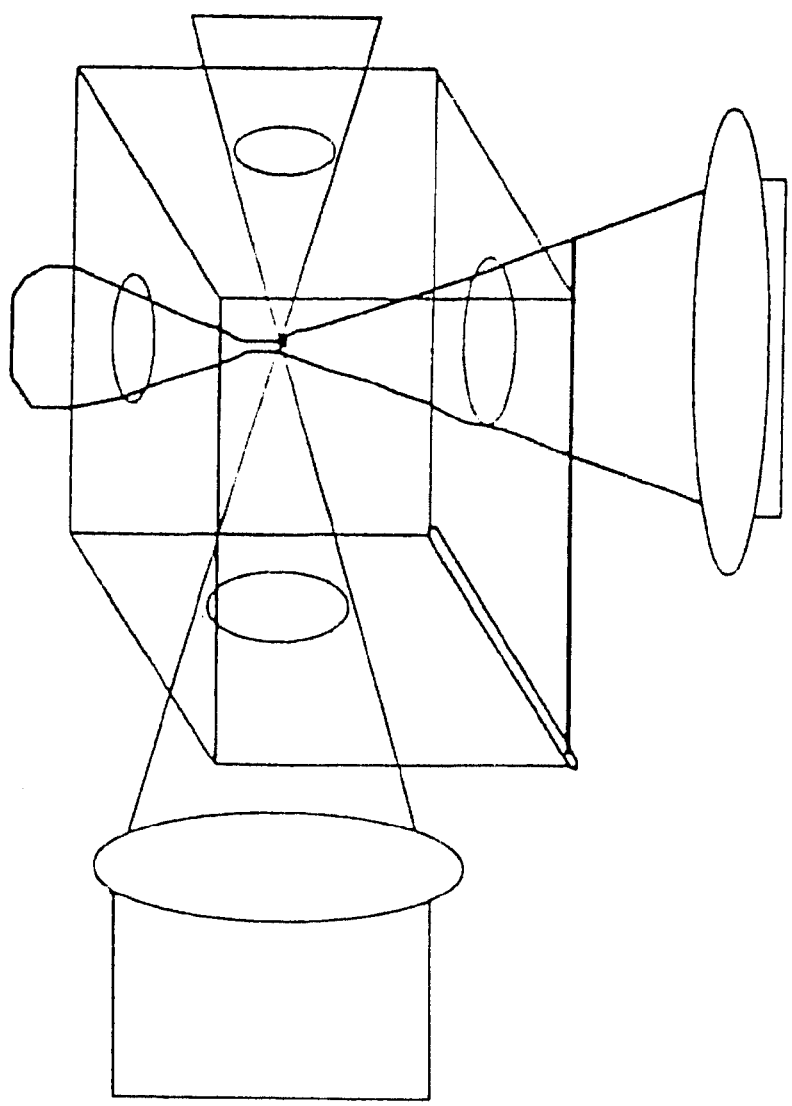
FIG. 1a is a diagrammatic perspective view showing the spatial and temporal coincidence of two beams of radiation at a voxel within the three-dimensional (3D) volume of an optical memory in order to effect two-photon (2-P) absorption.

It will be recalled that optical storage approach used of the present invention relies on recording bits in a volume, preferably by use of two-photon recording. A diagrammatic representation of the spatial and temporal coincidence of two beams of radiation at a voxel within the three-dimensional (3D) volume of an optical memory in order to effect two-photon (2-P) absorption is shown in FIG. 1a. A diagrammatic representation of the manner in which one of two beams of radiation is masked in order to write by process of two-photo absorption selected domains, or voxels, within a selected bit plane within the volume of an optical memory is shown in FIG. 1b.

Figure 2:
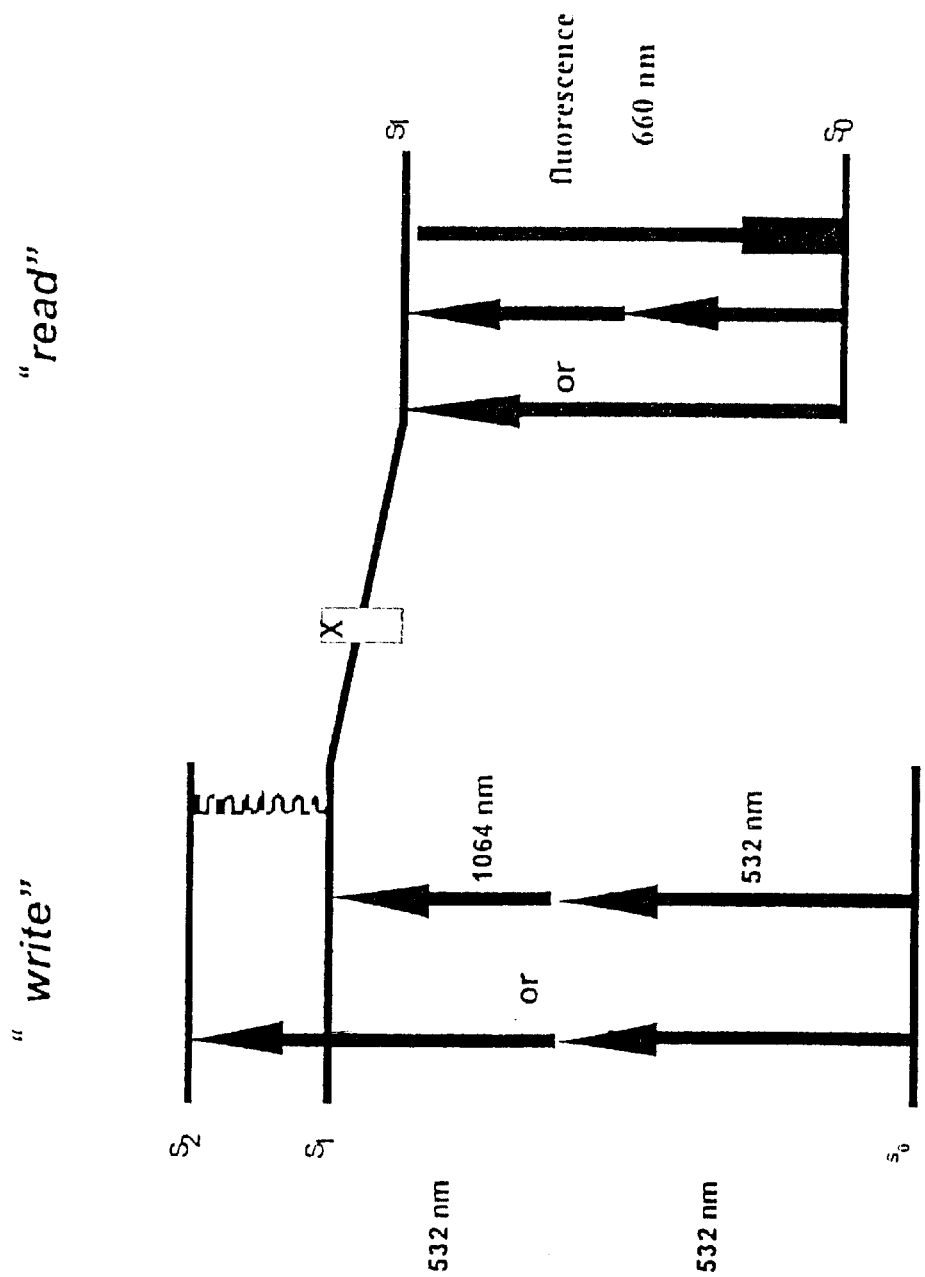
FIG. 2 is a diagrammatic representation of the radiation needed to effectuate writing (by 2-P absorption), and reading (by 2-P or single photon absorption), of the popular photochemical spirobenzopyran.

A spot is written in the volume of a molded organic polymer only at points of temporal and spatial intersection of two beams with sufficient photon energies, one carrying information (i.e.- at 1064 nm) and the other specifying location (i.e.- at 532 nm). For example, for the read-writeable-rewriteable embodiment of the present invention, the radiation needed to effectuate writing (by 2-P absorption) and reading (by 2-P or single photon absorption) of the popular spirobenzopyran photochemical is shown in FIG. 2. The simultaneous absorption of these photons results in a photochemical change in the active molecules—the spirobenzopyran—that is doped into the polymer which changes the absorption and fluorescence spectra of the material (though changes in refractive index, electrical characteristics, etc., may also be obtained with appropriately engineered dopant molecules).

Figure 3A:
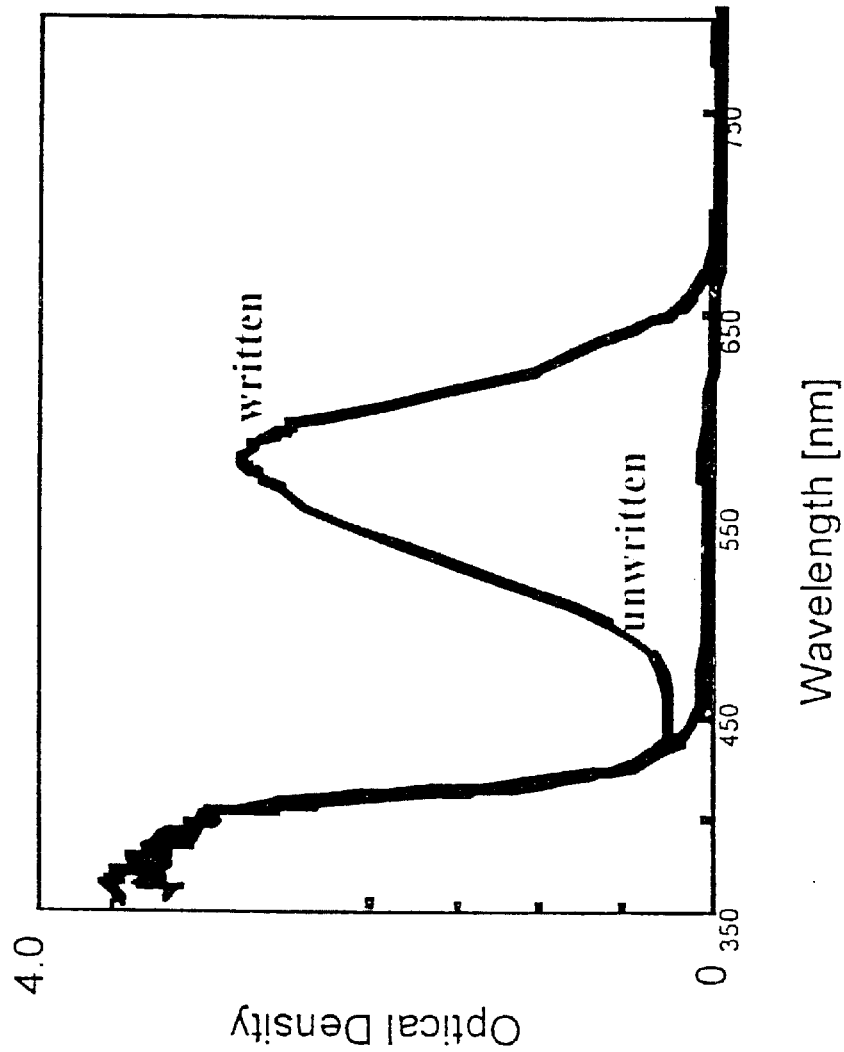
FIG. 3a is a graph showing the different absorption spectra of the written (changed to the merocyanine state), and the unwritten (changed to the spiropyran state) of the photochemical spirobenzopyran.
Figure 3B:
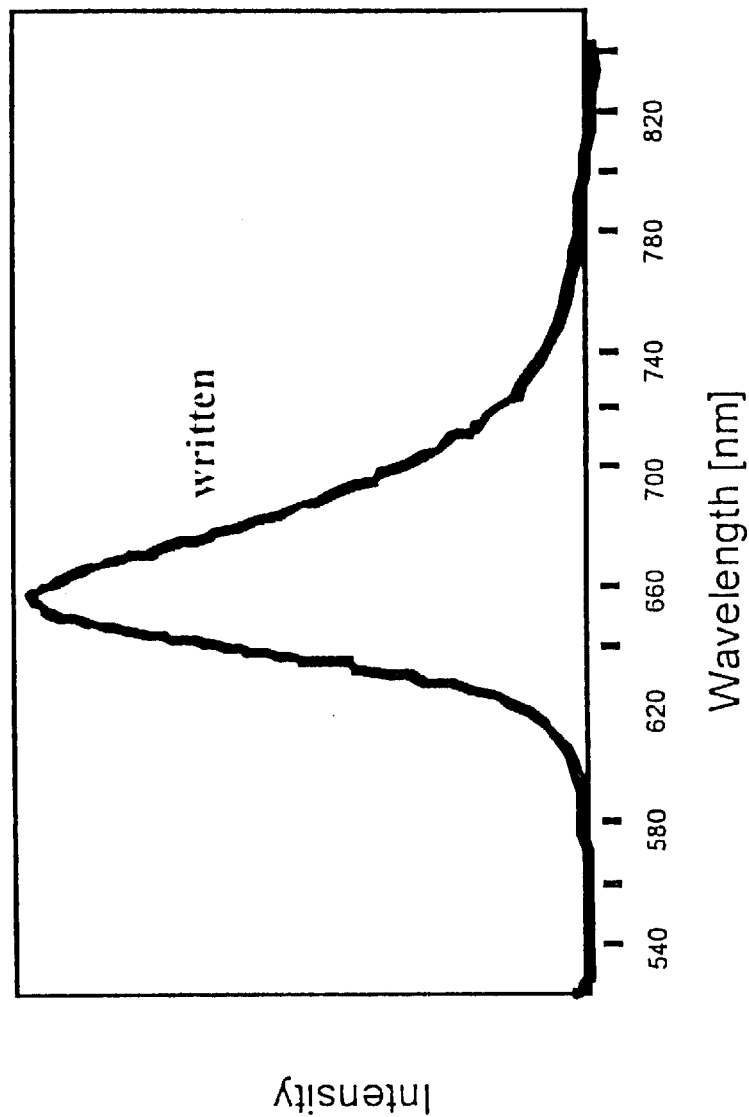
FIG. 3b is a graph showing the different fluorescent emission spectra of the written (changed to the merocyanine state), and the unwritten (changed to the spiropyran state) of the photochemical spirobenzopyran during read interrogation by incipient radiation as shown in FIG. 2.

The bits recorded by two beans of light may be read by but a single beam of light. Namely, one, written, state of the photochemical may be excited to fluorescence by single green photons absorbed within the written spot volume(s). By intersecting a 2-D page of data bits with a sheet of light, either lines (vectors) or, more importantly, planes of data domains, or voxels, may be written and read in parallel. The different absorption spectra of the written (changed to the merocyanine state), and the unwritten (changed to the spiropyran state) of the photochemical spirobenzopyran is shown in FIG. 3a. Likewise, the emission spectra of the written, merocyanine, state of this same photochemical spirobenzopyran during that read interrogation by incipient radiation diagramed as "read" in FIG. 3 is shown in FIG. 3b. There is no fluorescence of the un-written, spiropyran, state during the during the read interrogation by incipient radiation.

Clearly either differential absorbency—i.e., whether the interrogating light beam is to some degree absorbed, or is instead passed on through the volume optical memory store—or differential fluorescence—i.e., whether fluorescent light (which happens to pass through the volume optical memory without appreciable attenuation or any interaction with remaining, unilluminated, spirobenzopyran of either state) is emitted, or no—may be used to (radiatively) distinguish between the written and the unwritten states. Detection of the fluorescent emission which, from FIG. 3b may be observed to be within a narrow spectrum, is the preferred basis of detection. However, the principles of the present invention work equally well for detecting differential absorption.

It may be recalled from the background of the invention that assignee of the present invention Call/Recall has demonstrated multiple image storage in ROM configuration in a portable player unit. The results indicate (i) no crosstalk between layers and (ii) excellent stability of the written bits at room temperature. As many as 100 layers have been stored in an 8 mm thick cube. See K. Kayanuma, et al., op. cit. A more recent monolithic disk recording experiment has demonstrated 120 layer recording. Separate experiments have recorded layers as close as 30 $\mu$m without crosstalk, and bits as small as 7 $\mu$m.

Thus the fabrication of ultra-high capacity 3-D multilayer optical memory stores, including in the format of volume optical disks, has been eminently feasible for some time. However, in order to exploit this new storage media, a means to efficiently and cost effectively access the data stored throughout the volume of the disk has been needed. This optical storage accessing means is the subject of the present invention.

Figure 4:
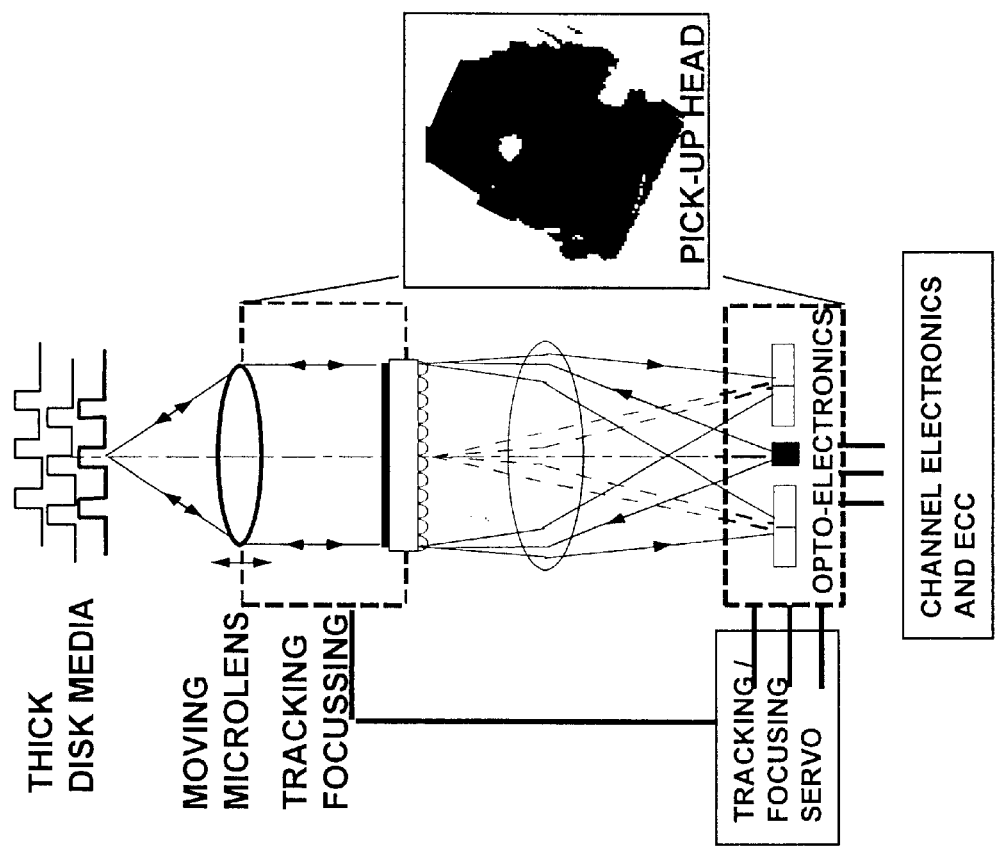
FIG. 4 is a diagram of a prior art optical disk.

It will further be understood, and remembered, that current optical disk techniques (e.g., such as for DVD optical storage disks) read a single track on a single layer. A prior art optical disk system is diagramed in FIG. 4. When access to data on another layer is necessary, the objective lens is moved to refocus onto that layer. Witness the analogous focusing shown in FIG. 1a for a volume optical memory.

This refocusing distance is typically less than 100 microns. However it cannot generally be accomplished without a break in the data stream due to the need to reestablish the correct focus, accurate tracking on the new track, and synchronization of the data channel clock to the new data stream. Extension of this current technique to thick multilayer disks is problematic for the following reasons.

First, the many layers may be distributed within a thickness of 5–10 mm, and to rapidly focus onto layers distributed over this large range would require a dynamic focus actuator of undesirable size, cost, and power dissipation.

Second, focusing over this large thickness range introduces large amounts of aberration into the optical path. To maintain the high resolution required of these systems, an aberration control system with high speed and large dynamic range would be needed.

Third, to efficiently use the high capacity offered by the multilayer approach, it is also necessary to provide increased data transfer rates. A powerful means of increasing data transfer rates is to read multiple tracks simultaneously. However, reading more than one track at a time requires a lens with a larger field of view (FOV), where the FOV is typically defined as the lateral distance over which the optical aberration is "well-corrected" and the resolution is limited mainly by diffraction. Such wide field lenses are generally larger, heavier, and more expensive than the single-spot lenses used in optical storage systems today. Thus any new technique should seek to read the most data marks within the smallest two-dimensional FOV to limit this increased complexity and cost.

Finally, it will be understood, and remembered, that current parallel readout techniques for single layer media have been proposed and demonstrated which simultaneously read several tracks along a radius or a chord of the disk. However, scaling these approaches to large numbers of tracks is difficult, since the 1-D nature of the line of bits does not efficiently use the 2-D optical FOV. On the other hand, reading a 2-D array of marks from a layer requires that the disk steps from one 2-D page to the next, starting and stopping rather than rotating continuously. This introduces problems in accelerating and decelerating the disk, and in keeping the subsequent vibrations from affecting the data signal integrity.

2. Thinking About the Essential Nature of the Present Invention, and the Scope of the Present Invention Notably, and despite the comments in the preceding section 1 directed against lens-based dynamic focusing, the scope of the present invention, as claimed, may prove to be nearly so expansive so as to subsume this method. This seeming inconsistency—that an invention should prove to nearly encompass a disdained embodiment—is perfectly acceptable if it is remembered (i) that no one has ever taught, nor even suggested, precisely how to practically perform dynamic focusing in three dimensions, let alone accurately over multiple voxels in a plane and (ii) the scope of an invention need not be limited only to preferred embodiments. In the past the search for a means to effectuate parallel volumetric data retrieval by dynamically focusing successive planes has been somewhat like the search for self-organizing biologic memories: it would be very nice to have but no one knows how to make it work, at least other than (at least for the case of volume optical memories) one-step-at-a-time as an experiment.

However, it may yet, in the future, be possible to do practical dynamic focusing, such as by use of a holographic dynamic focusing lens ("HDFL"). If such HDFL, or anything else, could somehow be employed as a practical objective lens, then such could prove to be anticipated by this Applicant's present invention—even though Applicant's invention is enabled by an entirely different lens embodiment—if (and only if) the data plane(s) focused (dynamically or otherwise) were to be tilted.

In simple terms, the present invention extends beyond the particular objective depth transfer imaging system—a doubly-telecentric afocal imaging system, or lens—that is highly preferred. The present invention is broader than just depth transfer imaging, let alone the preferred use of a doubly-telecentric afocal imaging system, because it "breaks the mold" simply by contemplating, for the first time, the optical reading and writing data planes that are not parallel, but are instead tilted, relative to major external surfaces of a volume optical memory. Heretofore, dynamic movement of an optical medium relative to an optical read-write head (so as to successively focus data planes parallel to a planar surface) was impossibly cumbersome, and impractical, as just explained. Reference FIG. 1.

Particularly in the case of an optical disk, spinning the disk did nothing to change a data plane radiatively addressed in a disk that held many such planes lying parallel to its major surfaces. And if the planes were instead aligned transversely to these surfaces, and radially within the disk (in a similar form to a common radial heat sink for a TO-4 package transistor), then the optical path to these planes was through the edge curvature of the disk, and unacceptable.

Applicant's new tilted data planes meet fundamental requirements. Simple rotation of an optical disk brings, for the first time, successive data planes—not bits, but planes—into view under a read-write head that is circumferentially stationary (although it may optionally move radially across the annulus of the disk). And, if it can be figured out how to selectively illuminate, and to accurately image, such tilted planes—as Applicant has, and as his presents specification teaches—then the optical data can be written and read to and from many domains (voxels) in each of these tilted data planes in parallel, and at greatly enhanced rates over the reading and writing of but one single domain at a time.

Accordingly, Applicant's invention should properly be considered to be, at least, both (i) tilted data plane segments within an optical media, the existence and use of which tilted data plane segments facilitated by a depth transfer optical imaging system, and (ii) a depth transfer optical imaging system that, for the first time, makes possible the reading, and the writing, of data plane segments within an optical media which plane segments are, in particular, tilted relative to a major planar surface(s) of the medium (to the side of one such planar surface the imaging system resides). Each of these principal aspects of the invention is of independent, and autonomous, significance. Both aspects taken together are synergistic.

3. The Solution to Reading and Writing a Volume Optical Memory: The Three-Dimensional "Compact Disk" Optical Memory of the Present Invention The solution of the present invention to the challenges discussed in section 1. above lies in exploiting the third dimension to simultaneously readout many one-dimensional (1D) arrays of tracks (taken along chords and a radius of the disk), that are distributed throughout the depth of the disk so as to form a "page" that is tilted with respect to the disk surface. A diagrammatic perspective view of a complete three-dimensional "compact disk" (a "3-D CD") optical memory system of the present invention wherein all the bits upon an entire bit plane are written and read in parallel at one time is diagrammatically illustrate in FIG. 5. The bit plane is hard to see at the scale of, and in the view of, FIG. 5: it is more completely diagrammatically illustrated in the perspective view of FIG. 6a, and in the top view of FIG. 6b.

The preferred optical memory system 1 has as its optical memory store the disk 2 which is rotated upon a spindle 21 in the direction of vector R at a rate of, typically, 1300 r.p.m. An optical read/write head 3, shown in expanded view at the upper right of FIG. 5, may be fixed stationary, but is typically located at the end of an arm 4 that is from time to time stepped in rotational position along bi-directional vector S by a servomotor 5 (control circuit not shown) at a response settling time of, typically, 30 milliseconds. An addressing beam forming optics 6 in the form of a cylindrical lens serves to channel light, typically from a laser (not shown), into the edge of the rotating disk 2 so that the light assumes the spatial aspect, at least where it passes under the read/write head 3, of a (i) plane that is (ii) tilted relative to the major, top and bottom, surfaces of the disk 2. The read/write head 3 preferably consists of a first convex lens 31 and a second convex lens 32 that together form a doubly telecentric afocal imaging lens set 31 32. Between the lens 31 and the lens 32 is a mirror 33 that serves to fold, and re-direct, the image. A data plane segment within the disk 2 (not clear in FIG. 5, see, for example, FIGS. 6a–6c, is imaged by the doubly telecentric afocal imaging lens set 31–32 to the detector array 34. The read/write head 3 may optionally employ a z axis positional actuator 35, normally a piezoelectric bender beam or like element with a required excursion of, typically, 6–10 mm.

The imaged "bit plane segments", or "bit plane pages" are in the form of tilted plane segments which collectively resembling the blades in a turbofan engine. Each two-dimensional (2D) data page is composed of a "column" of 1D track vectors, with each track vector residing on a separate horizontal layer of the disk. See FIG. 6a, which is simplified for purposes of clarity to show only one superlayer (multiple superlayers are illustrated in FIG. 6c).

Each tilted plane segment is rotated by an angle theta (θ), typically 45°, about a radial line passing through the middle of the disk thickness. See FIG. 6a. The radial extent of the pages is limited to a "supertrack" as shown in FIG. 6b. For example, three supertracks are shown as three annular bands in the simplified illustrated of FIG. 6b. There are normally 39 supertracks in a disk of 2.5 cm (1") diameter, and 40 in a disk of 13.3 cm (5¼") diameter. These supertracks enable more efficient use of the disk volume, and the optical Field of View (FOV), as discussed below.

The disk 1 is normally comprised of a number of superlayers, of which three are shown (for purposes of clarity) in the simplified illustration of FIG. 6b. There are normally 19 superlayers in a disk of 2.5 cm (1") diameter and 6 mm thickness, and 19 in a disk of 13.3 cm (5¼") diameter and 10 mm thickness.

Figure 7:
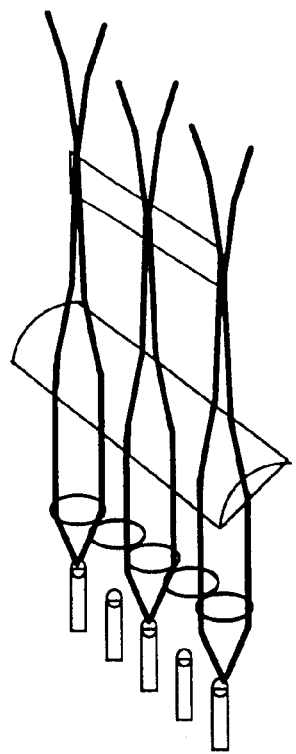
FIG. 7 is a ray trace drawing of the preferred long focal length cylindrical side lens, previously seen in FIG. 5, of the preferred imaging system of the present invention.

In a ready-only memory system (ROM) system, only the illuminated data page and the detector plane must be considered. The tilted illuminator is shown in FIG. 5 and again, in isolation at an expanded scale, in FIG. 7.

Figure 5:
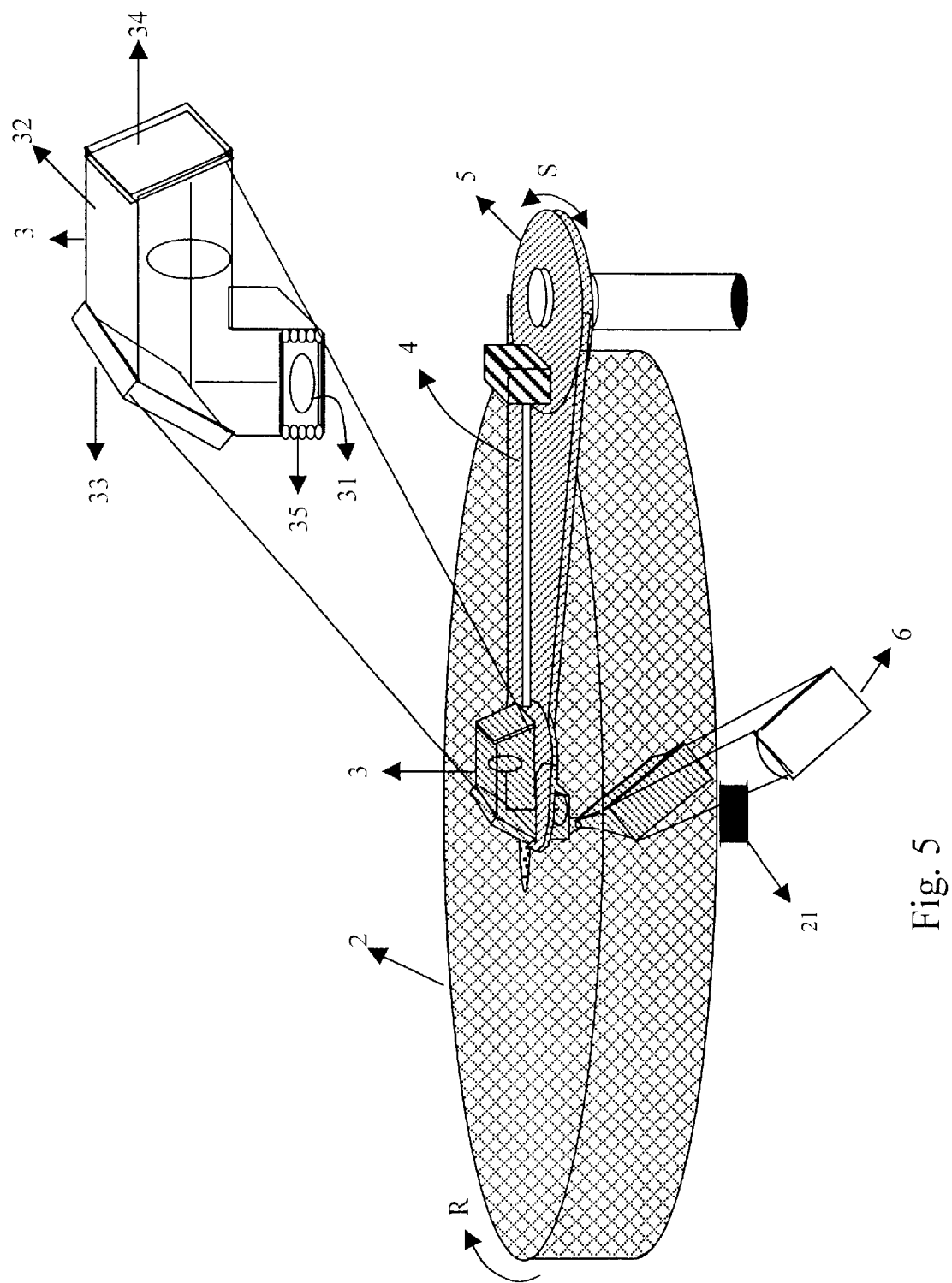
FIG. 5 is a diagrammatic perspective view of a complete three-dimensional "compact disk" ("3-D CD") optical memory system of the present invention wherein the bits upon an entire bit plane are written and read in parallel at one time.
Figure 6B:
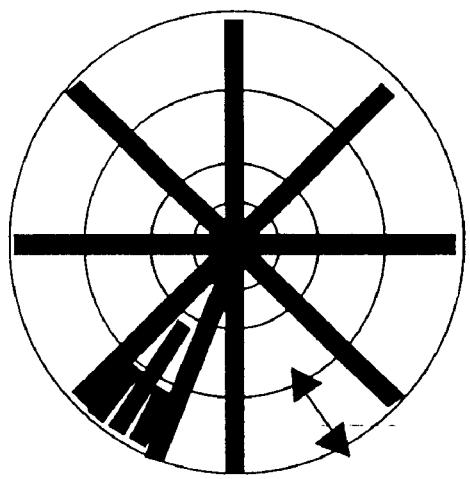
FIG. 6b is a top view of the optical disk in accordance with the present invention previously seen in FIG. 6a where the data plane segments of the "supertracks" (of the single superlayer) are shown to occupy the angular volume of the disk.
Figure 6A:
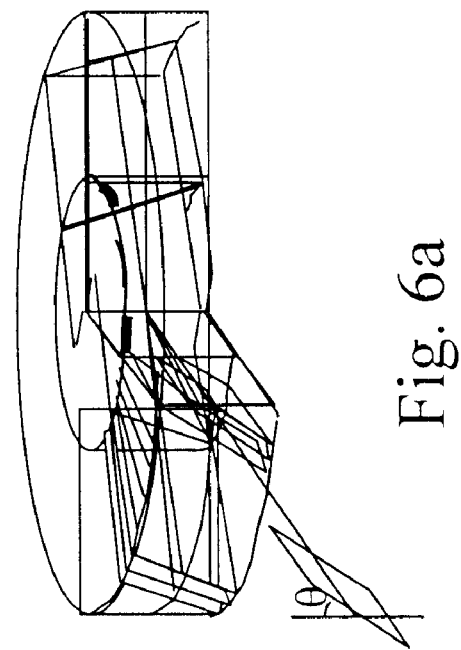
FIG. 6a is a diagrammatic side view of a "single superlayer" optical disk in accordance with the present invention diagrammatically showing the imaging of multiple "pages", or "plane segments", that are tilted with respect to the disk surface; the plane segments, or pages, collectively resembling the blades in a turbofan engine, where each two-dimensional (2D) data page is composed of a "column" of 1D track vectors, and where each track vector resides on a separate horizontal layer of the disk.
Figure 6C:
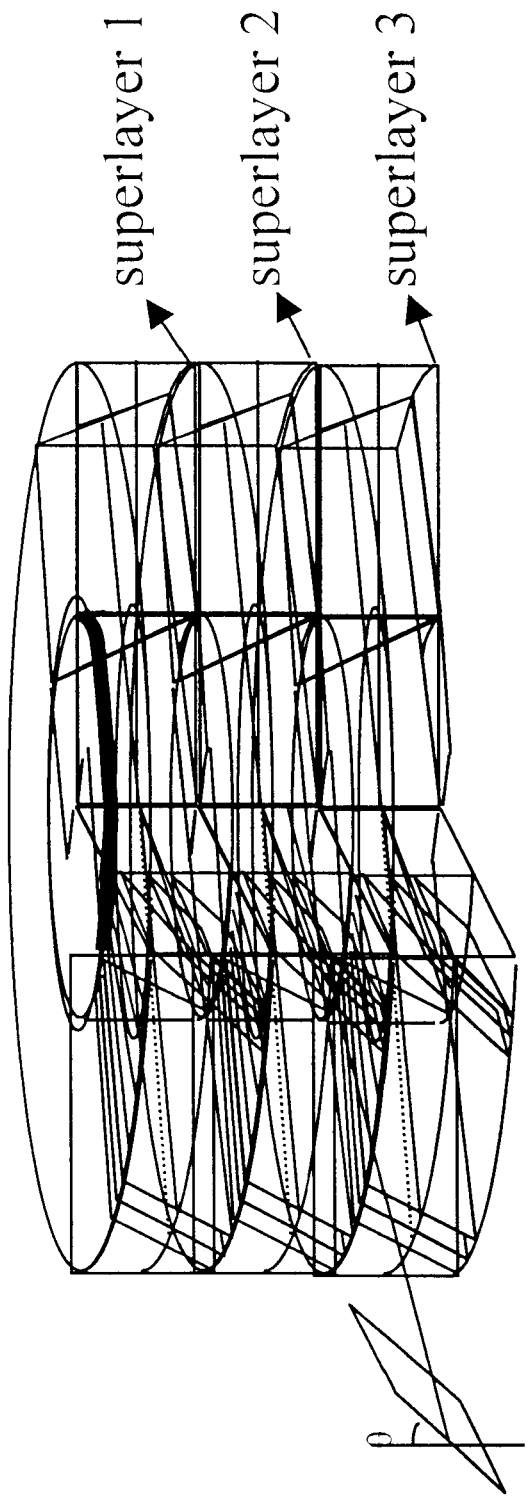
FIG. 6c is a diagrammatic side view of a multiple (3) superlayer optical disk in accordance with the present invention.

In a writeable system, the data page composer (a mask or spatial light modulator) plane must also be tilted at the appropriate angle relative to the data plane, as is shown in FIG. 5. The imaging constraints are the same as for the readout case. The addressing beam forming optics 6 in the form of a cylindrical lens, previously seen in FIG. 5, is shown again, now as serving to shape illumination from a number of laser light sources 7, normally laser diodes, in FIG. 7. The focal length of the addressing beam forming optics 6 is long relative to the field of view of (the optics of) the read/write head 3. This means that illumination of a portion of the (rotating) disk 2 is substantially in a plane where it passes under the read/write head 3 (shown in FIG. 5). This long focal length is reasonably important: it means that the is little or nonsensitivity in defining, by sheet light illumination, bit plane segments, and all the domains/voxels thereof, in a direction circumferentially around the disk. In other words, should the timing to "scan in" the imaged bit plane be realized, thee has already been realized a good, clean, focused illumination of the subject bit plane, and all the domains/voxels thereof—and none but. This illumination is not only "clean and precise", it is insensitive to "noise" in the form of variation in the radial distance of the addressing beam forming optics 6 from the axis of the rotating optical disk 3.

Figure 8:
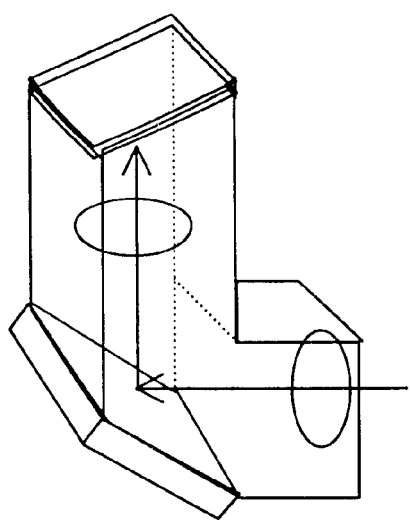
FIG. 8 is a diagrammatic view, with the internal optical path exposed, of the preferred doubly telecentric afocal lens read/write head, previously seen in FIG. 5, of the preferred imaging system of the present invention.

The imaging performed by the read/write head 3, shown twice in FIG. 45 and shown yet again in expanded x-ray view in FIG. 8, is more complex. To image the tilted data planes, a novel property of telecentric afocal imaging systems is exploited, which enables the data in the tilted plane to be accurately imaged to a conjugate tilted detection plane, but with constant magnification both laterally across the tilted plane, and throughout the depth of the disk. The "depth transfer imaging" is a most important property of the present invention. Before the preferred optical read/write head shown in FIG. 5, and again isolated at an expanded scale in FIG. 8, is discussed, the optical function of the preferred doubly-telecentric afocal imaging system will be explained.

This is shown in the following derivation. Consider the imaging system shown in FIG. 9. The aperture stop is located at the back focal plane of L1 and at the front-focal plane of L2, therefore, the system is telecentric both in the object space and the image space. For all conjugate points principal rays are parallel to the optical axis. For this system, both the transverse magnification ($M=h_2/h_1$) and the angular magnification ($\beta_2/\beta_1$) are constant and are given by $$M = h_2/h_1 = -f_2/f_1 \quad [1]$$

$$\beta_2/\beta_1 = -(n_1 f_1)/(n_2 f_2) \quad [2]$$

The ratio of the image space and object space NA is then given by $$\frac{NA_2}{NA_1} = \frac{n_2 \beta_{2,max}}{n_1 \beta_{1,max}} = \frac{1}{|M|} \quad [3]$$

Figure 9:
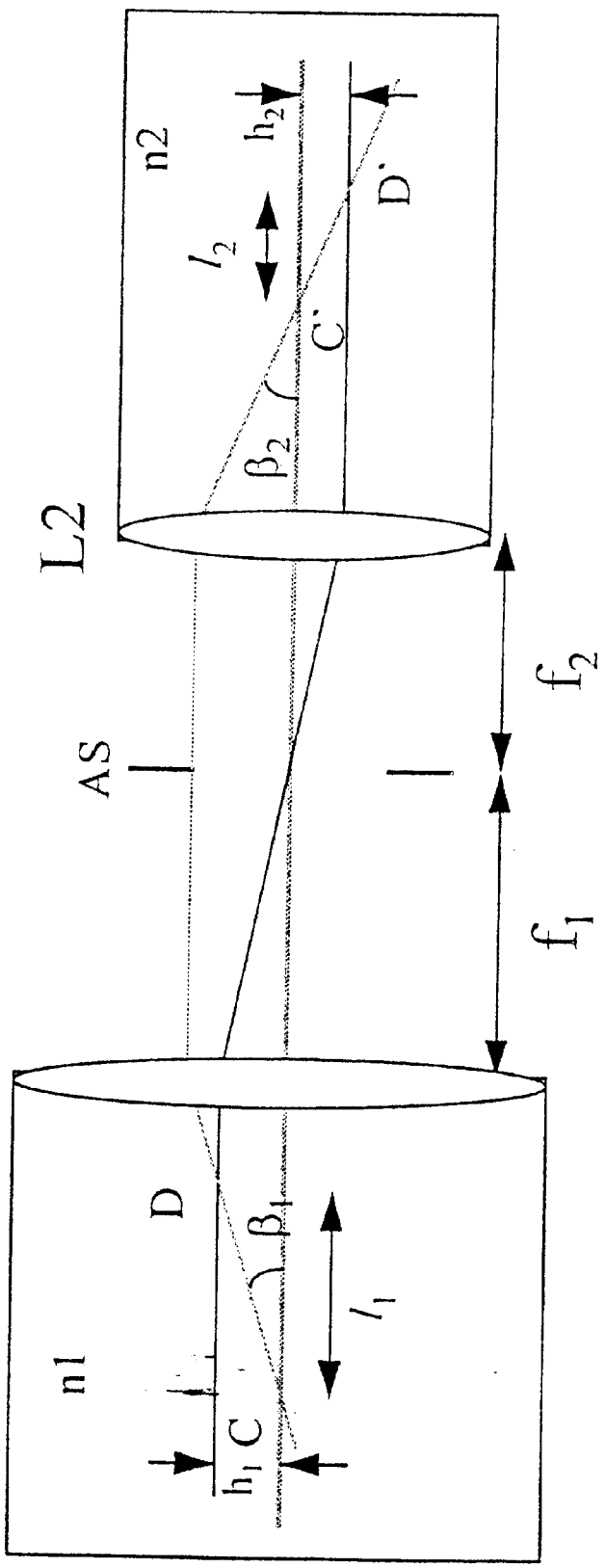
FIG. 9 is a side view ray trace drawing of the preferred doubly telecentric afocal lens read/write head, previously seen in FIGS. 5 and 8, of the preferred imaging system of the present invention.

Consider the conjugates CC' and DD' in FIG. 9, the longitudinal magnification ($l_2/l_1$) can be expressed as $$\frac{l_2}{l_1} = \frac{h_2 \beta_1}{h_1 \beta_2} = \frac{n_2}{n_1} M^2 \quad [4]$$

This is the required conjugate distance equation, which states that the longitudinal magnification is a constant and equal to the transverse magnification divided by the angular magnification. Since the magnification is insensitive to de-focus, telecentric systems are commonly used for measuring heights.

Figure 10:
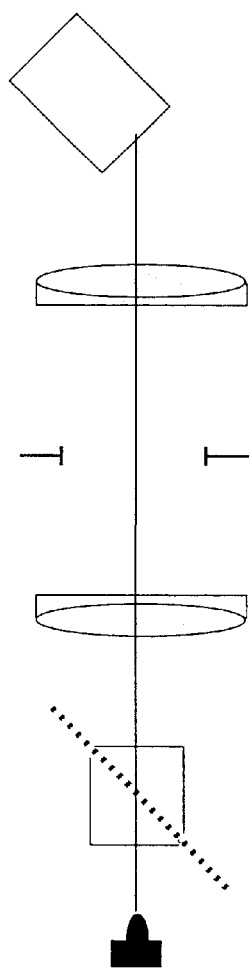
FIG. 10 is a top view ray trace drawing of the preferred doubly telecentric afocal lens read/write head, previously seen in FIGS. 5 and 8, of the preferred imaging system of the present invention.
Figure 11B:
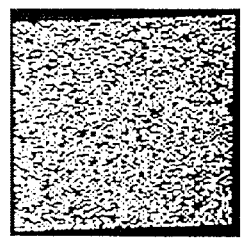
FIG. 11, consisting of FIGS. 11a and 11b, show experimental results where, as diagramed in FIG. 5, a fluorescent plane was simulated by illuminating a chrome mask with a LED, and immersing the mask between 2 right angle prisms with index matching liquid disk in accordance with the present invention with the illumination pattern shown in FIG. 11a; the incoherently-illuminated tilted data plane (segment) imaged at 1:1 magnification at a later time to a tilted CCD array in air to produce the output image shown in FIG. 11b.
Figure 11A:
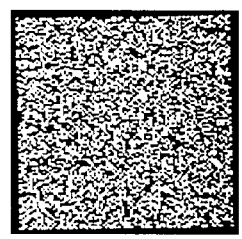

FIG. 10 shows the Depth Transfer Objective (DTO) of the present invention in the form of the doubly telecentric afocal imaging system of FIG. 9 expanded to the optical path between the object plane and the detector. The typical appearance of an object data plane segment is shown in FIG. 11a; and the equivalent image of this data plane segment in FIG. 11b.

In accordance with the present invention, this optical system can be used for parallel access multilayer optical storage systems. Since the magnification is the same for all conjugates, data in different layers can be simultaneously recorded (or retrieved) in parallel by tilting both the data plane and the detection plane with respect to the optical axis, such that sin ($\theta$in)=M sin ($\theta$out). Additionally, different layers may be accessed sequentially rather than simultaneously by advancing both the input mask (or detector) and the storage media simultaneously, or by moving the lens system.

The depth transfer objective (DTO) approach of the present invention provides true 3-D parallel reading and writing capabilities. In contrast to the large stroke physical motion of the lens that would be required in a conventional optical pickup head, this approach read or writes across many layers without the large-stroke physical motion, nor the need to reacquire tracking, focus, and synchronization to access data from different layers. In principle, the DTO can read or write an entire 10 mm thick disk without the need for a 10 mm stroke lens actuator. Additionally, because the data plane is tilted with respect to the lens, it occupies less of the lateral field of view of the lens, lowering the aberrations, and enabling simpler, less expensive and more manufacturable lens designs. Stated differently, the large rectangular data plane appears to the lens as a smaller square lateral object when viewed obliquely in the DTO optics, thus wide FOV aberration correction is unnecessary, and simple, potentially single element lenses may be used.

Additionally, and despite the fact that different data marks are at different depths within the media, spherical aberration (SA) can be kept constant for all data marks if the detector (or data input mask) is immersed in a material with the same index of refraction as the data medium (i.e.-"potting" the detector in a transparent plastic package). The constant aberration at the detector array may then be corrected with a simple aspheric element placed between the lenses at the aperture stop of the afocal system. Even without embedding the detector in a higher index material than air, the SA may be balanced by de-focus, and reasonable correction may be achieved with the detector in air.

Another important advantage of using this configuration is that, off-axis aberrations (e.g., coma, astigmatism, field curvature, distortion) due to imaging into thick media are proportional to the angle principal rays make with the optical axis. For this system, off-axis aberrations due to media are zero in the ideal case of no disk wobble or warping, and the only aberration that accumulates is the spherical aberration. However, even in the case of a wobbling disk, where off-axis aberration may be introduced, the aberrations of the two lenses that are in odd order with the pupil coordinate (e.g., coma and distortion) will be of opposite signs, and if the magnification is unity, they completely cancel each other.

Figure 12:
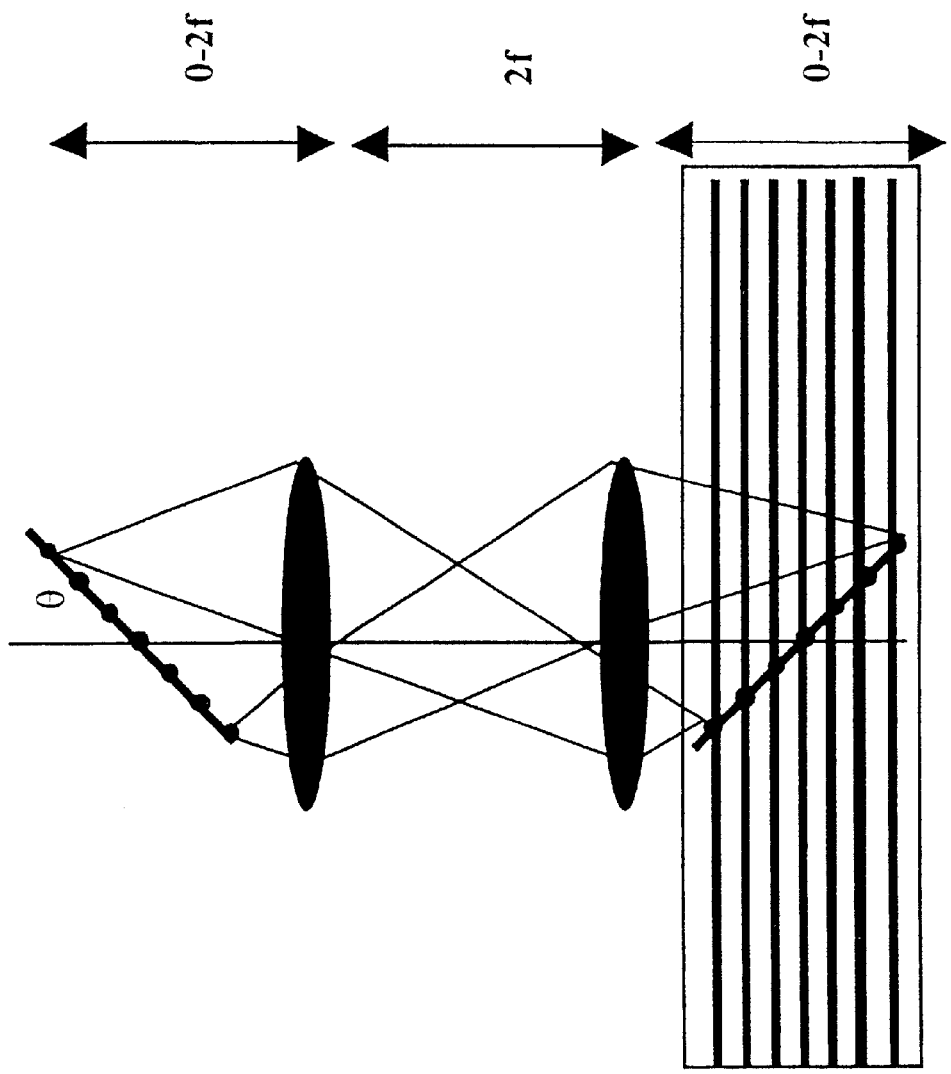
FIG. 12 is a side view ray trace drawing of the preferred doubly telecentric afocal lens read/write head, previously seen in FIGS. 5 and 8, with (i) a tilted two-dimensional detector array (ii) located in free space.
Figure 13:
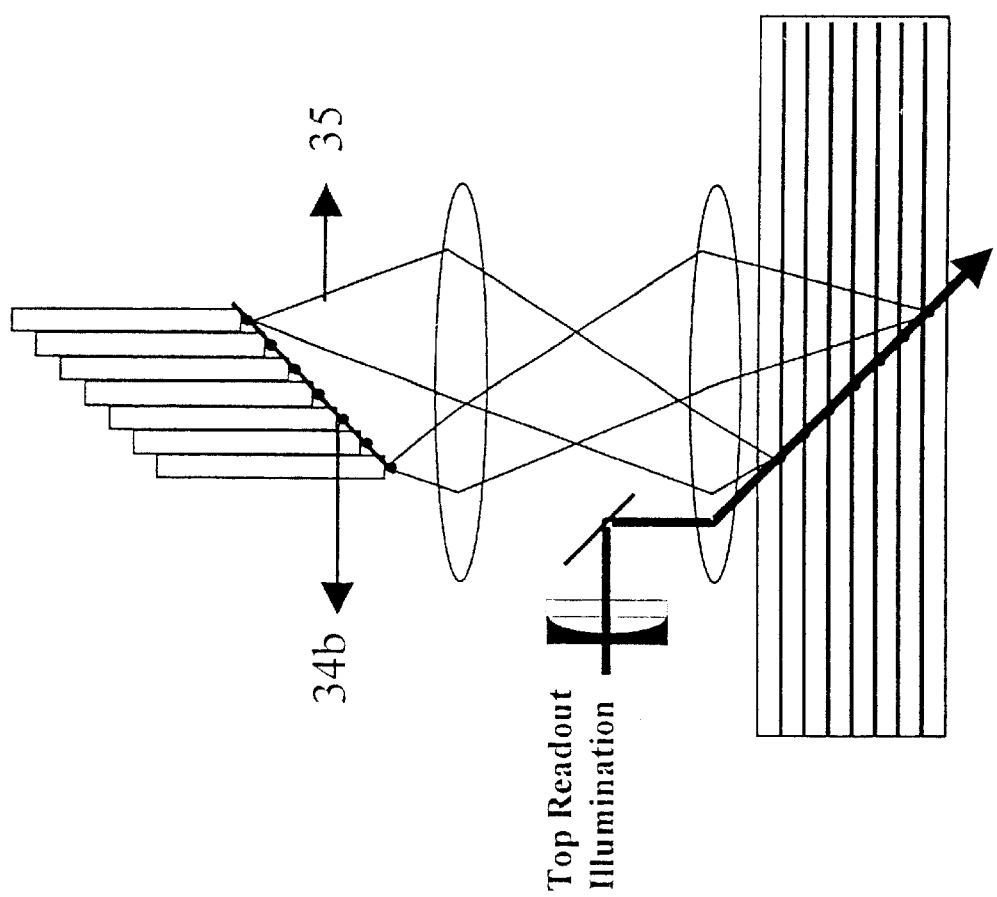
FIG. 13 is a side view ray trace drawing of the preferred doubly telecentric afocal lens read/write head, previously seen in FIGS. 5 and 8, with (i) a staircase array of one-dimensional detectors (ii) located behind a piece of the same polymer from which the optical disk is made, thereby to mirror the index of refraction in different portions of the optical path.

The tilted detector array may be achieved by tilting a conventional 2-D detector array 34a as shown in FIG. 12, or by stacking 1-D detector arrays in a "staircase" pattern as shown in FIG. 13. The views of both FIGS. 12 and 13 are side ray trace drawings. In FIG. 13 the staircase array of one-dimensional detectors 34b is located behind a piece 35, which may, but need not be, of the same polymer material from which the optical disk is made. The piece 35 services to mirror the index of refraction in different portions of the optical path. This serves to correct (by mirrored compensation) for diffraction effects in the optical path.

Figure 14:
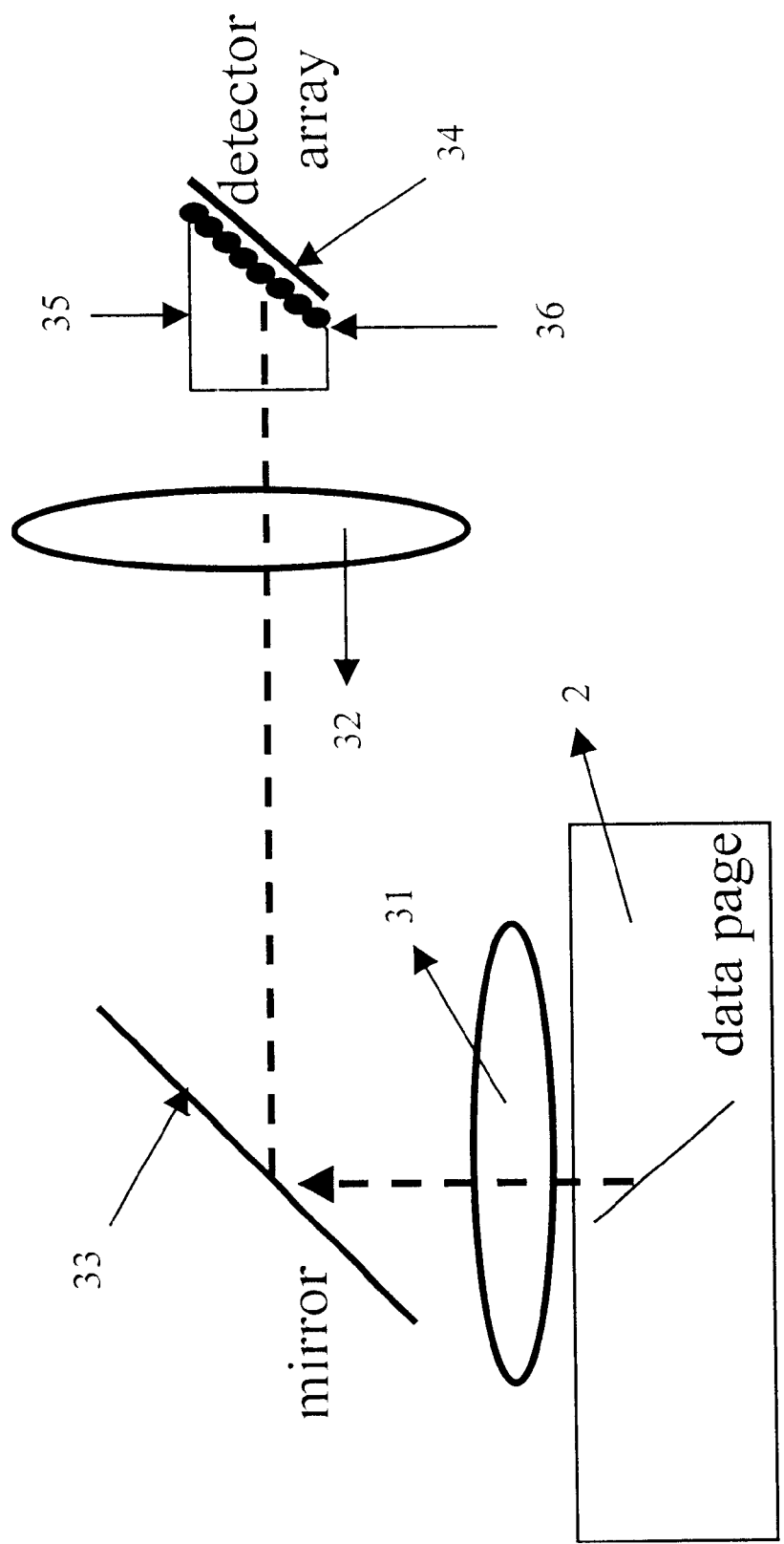
FIG. 14 is a diagrammatic view of the identical situation as in FIG. 13 where the tilted detector array is located behind the same polymer as is in the optical disk.

This diffraction correction technique is again illustrated in FIG. 14. Also in FIG. 14 an optional "fisheye" aspheric microlens array is interposed in front of the detector array 34 in order to concentrate the images of the individual bit domains/voxels—which images may be slightly misregistered—onto the separate detection cells of the detector array 34.

It will be recalled that, as illustrated in FIGS. 5 and 6, illumination for reading may be supplied from the edge of the disk. This is not the only location from which read illumination may be supplied. Illumination for writing and reading may be from the top or bottom of the disk (flat surfaces) as well as being incident from the side of the disk. Side-incidence may enable the largest rectangular data planes, since the effects of beam diffraction are along the short dimension of the rectangle. However, other approaches, such as multi-focus lens techniques, can help minimize the diffraction effects and enable large rectangular data planes using top or bottom illumination. FIG. 15, consisting of FIGS. 15a through 15c, shows the three different addressing illumination schemes of the present invention: orthogonal, confocal-theta, and co-linear.

Figure 16A:
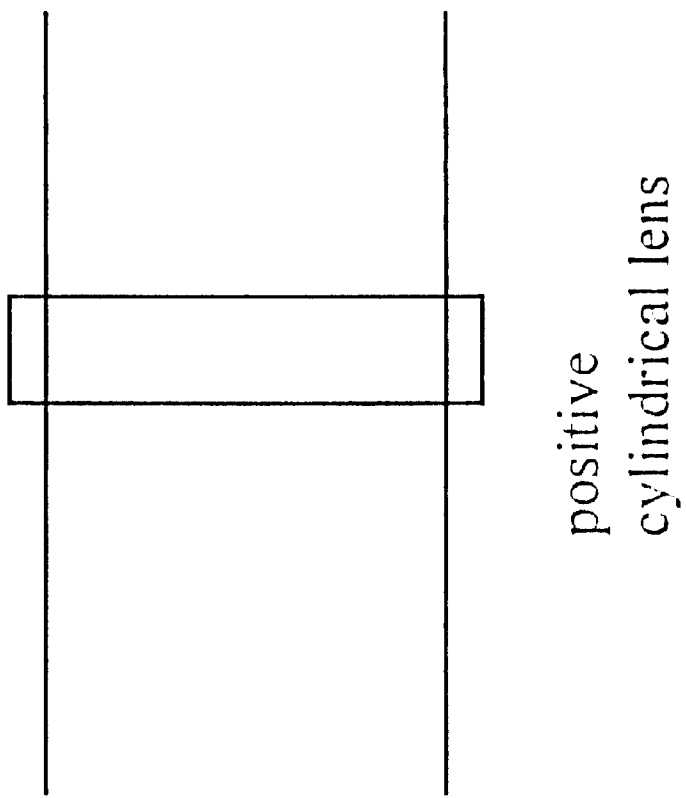
FIG. 16, consisting of FIGS. 16a and 16b, respectively show in the plane of the data page, and perpendicular to the plane of the data page, the simple anamorphic focusing of a beam to a sheet of light as used by the orthogonal or confocal-theta addressing-beam forming optics respectively shown in FIGS. 15a and 15b.
Figure 16B:
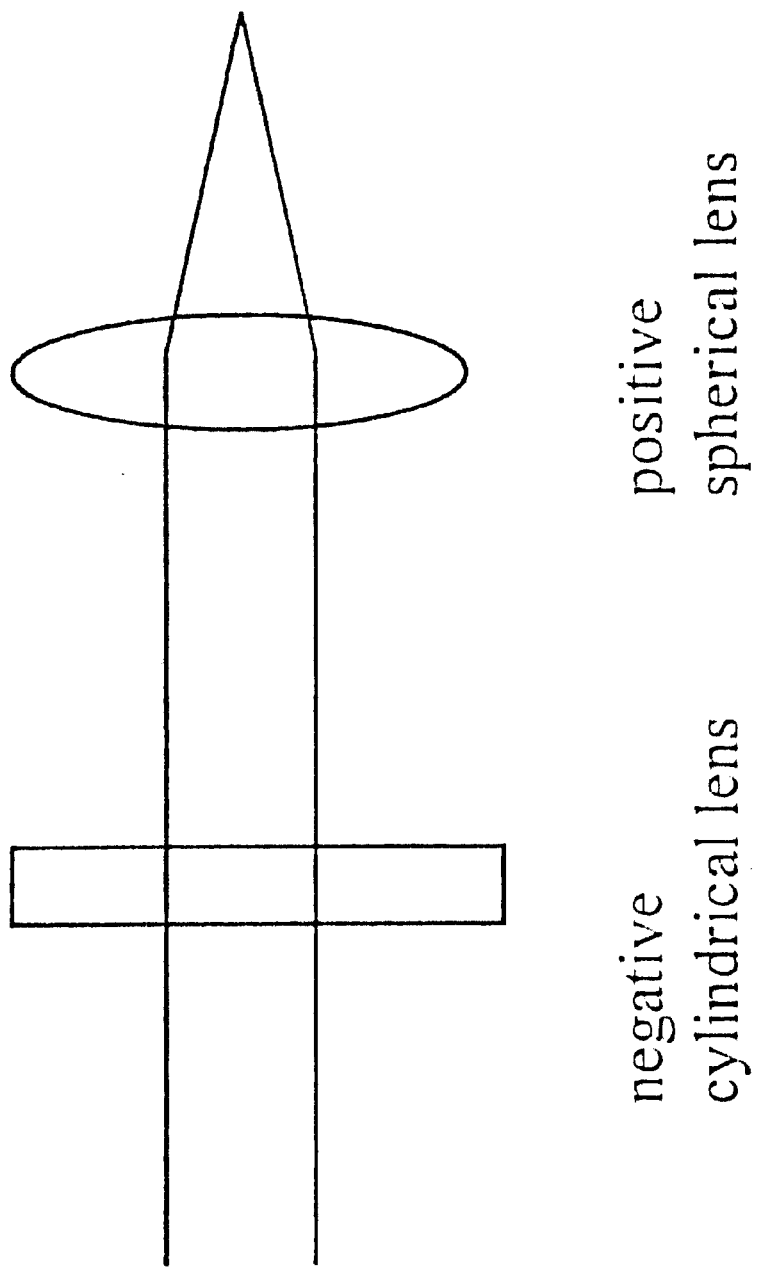

FIG. 16a shows, in the plane of the data page, the simple anamorphic focusing of a beam to a sheet of light as used by the orthogonal or the confocal-theta addressing-beam forming optics respectively shown in FIGS. 15a and 15b. FIG. 16a shows, in a plane perpendicular to the plane of the data page, the same simple anamorphic focusing of a beam to a sheet of light.

Figure 17A:
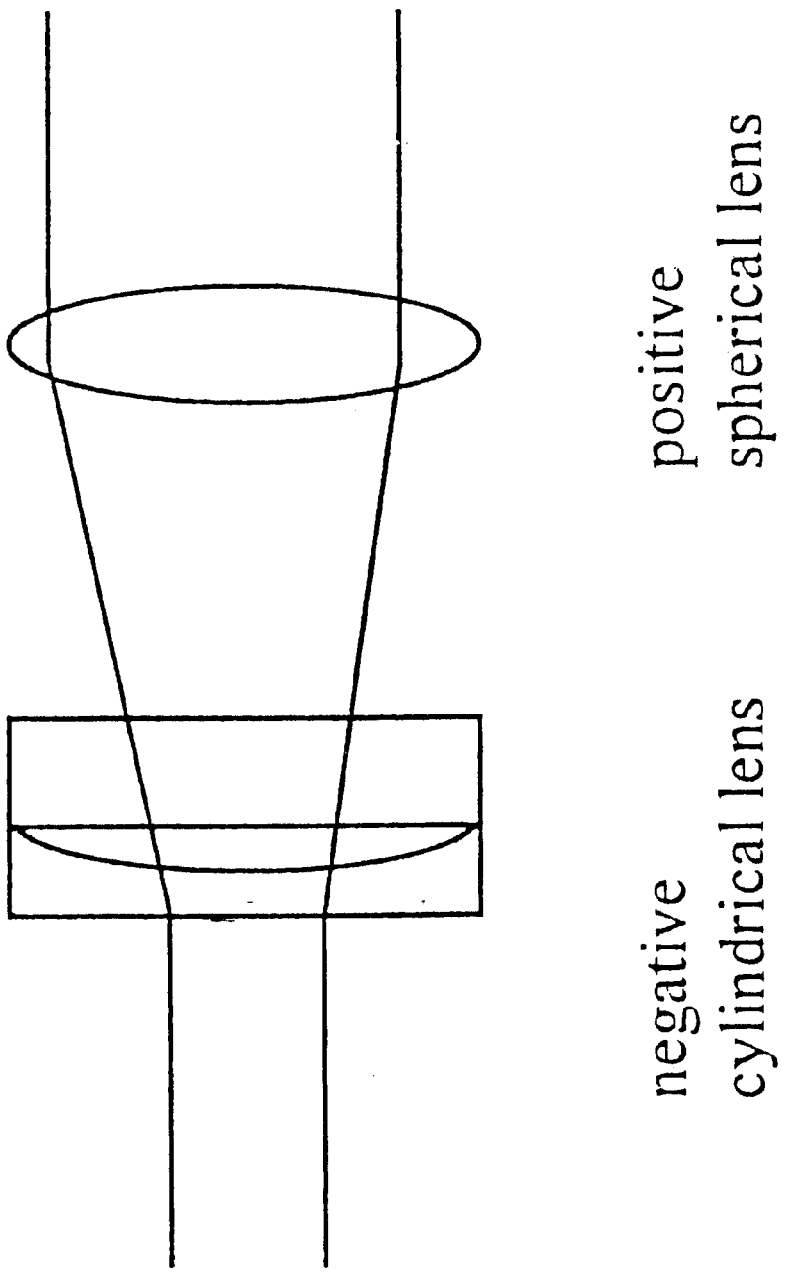
FIG. 17, consisting of FIGS. 17a and 17b, respectively show in the plane of the data page, and perpendicular to the plane of the data page, the combined beam expansion/compression, and anamorphic focusing to a sheet of light, as is used by the orthogonal or confocal-theta addressing-beam forming optics respectively shown in FIGS. 15a and 15b.
Figure 17B:
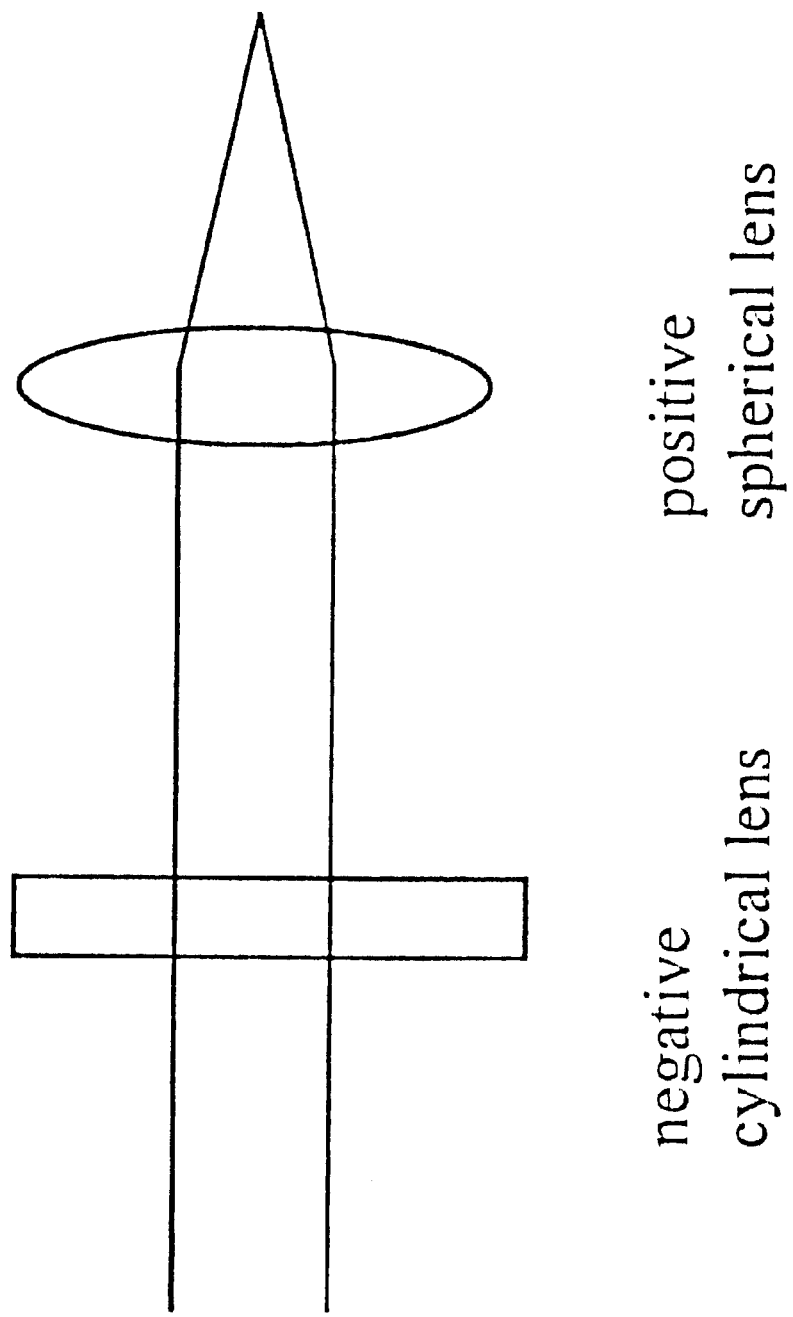

FIG. 17a shows, in the plane of the data page, the combined beam expansion/compression, and the anamorphic focusing to a sheet of light, as is used by the orthogonal or confocal-theta addressing-beam forming optics respectively shown in FIGS. 15a and 15b. FIG. 17b shows, in a plane perpendicular to the plane of the data page, the combined beam expansion/compression, the same combined beam expansion/compression, and anamorphic focusing to a sheet of light.

Figure 18:
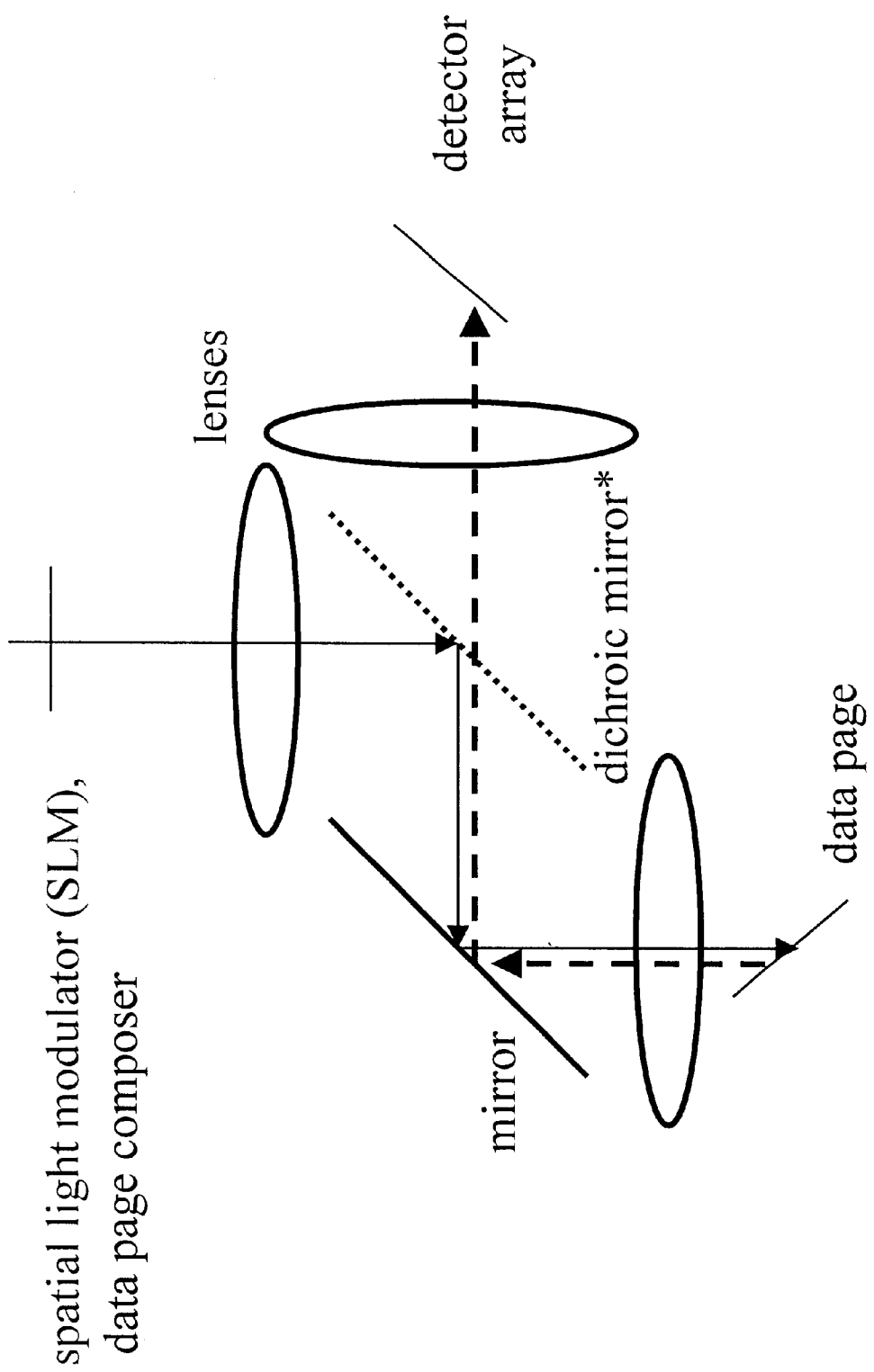
FIG. 18 is a schematic diagram of the combination read/write head, having orthogonal addressing illumination of the data page, or the present invention.

A schematic diagram of the combination read/write head, having orthogonal addressing illumination of the data page, of the present invention during use for writing is shown in FIG. 18.

The functionality and viability of the depth transfer optics (RTO) approach of the present invention for 3-D Disk writing and reading has been demonstrated in simulations and experiments. A fluorescent plane was simulated by illuminating a chrome mask with a LED, and immersing the mask between two right angle prisms with index matching liquid. An illumination pattern obtained was photographically recorded. At a later time, the incoherently-illuminated tilted data plane (segment) was then accurately imaged at 1:1 magnification to a tilted CCD array in air. The output image was again photographically recorded, and was equivalent to the input image. Compare FIGS. 11a and 11b.

The optical disk recorder/player/re-player of the present invention diagrammatically illustrated in FIG. 5 typically illuminates tilted planes recorded in an 6 mm thick by 1 inch diameter disk, and transfers the resulting fluorescence to a tilted CCD array. With the disk rotation as the only movement, typically some 250 to 1250 tilted planes are recalled sequentially as the disk rotates.

In accordance with the preceding explanation, variations and adaptations of the optical memory systems, optical read-write heads, optical memory reading and writing techniques, and/or optical storage media patterned (written) in tilted data planes in accordance with the present invention will suggest themselves to a practitioner of the optical systems, and/or of the optical memory design, arts. For example, it is a simple matter to vary the angle of the data plane segments from the preferred 45°. Other optical heads, such as are, by way of example, made from holographic lenses, can serve to image a tilted plane. It does not matter which way the image plane segments are tilted relative to the disk rotation.

Multiple read-write heads can be used in parallel. If multiple colors, and multiple corresponding photochemcials, are used, then the (parallel, optical) data readout is so fast, and so sensitive, it should be possible to interrogate all the different colors (as correspond to different data bits) of each domain during its momentary positioning under the read-write head. In other words, the optics and electronics are fast—even at high data storage densities—compared to the mechanics of rotating the disk.

In common with all optical memories, the energy for, most particularly, reading an optical memory in accordance with the present invention does not come, as it does with a magnetic disk, from moving a (minute) magnetic domain under a (necessarily) closely proximate magnetic-field-sensitive read head, transforming a minute amount of the mechanical energy of disk rotation into an equally minute electrical current. In an optical memory, the energy to read the memory comes from the energy beams, which can be made bright to read small domains very quickly at a high optical signal to noise. Although the present invention does not require lasers, and may indeed be implemented with low-cost light emitting diodes, it is fully compatible with laser illumination.

The considerable difference of an optical memory in accordance with the present invention from the more cumbersome apparatus of the prior art can perhaps be illustrated by comparison to science fiction, wherein in certain tomes "message disks" of an advanced civilization have simply been spun in air, like spinning silver dollars, to voice and/or show their audio-visual messages. Although written optical disks in accordance with the present invention do not provide audio playback, consider what will happen if such a disk, impressed with successive image planes (frames) of imagery, was to be set into a jig where common sunlight has been gathered, concentrated, spectrally filtered, and passed into the side of the disk, which is slowly rotated, preferably through a step-down gear drive, by hand. If the eye is put at the position of the conjugate plane, or in such further image plane as is established by simple mirrors, then the eye will see the successive images upon the disk, much as the eye can otherwise see successive frames of developed photographic film.

4. Environment of the Invention, and Performance Limiting Factors

The present invention is thus a "new-generation" optical memory system, the impressive performance specifications of which are finally given in section 6, below. It is expected to offer many times the data storage capacity, data transfer rate, and cost effectiveness of even those manifestations of magnetic and first generation optical technologies with which the technology of the present invention will in the future compete. According to the supposed advantages of the optical memory system of the present invention, a discriminating student of the new technology will be very careful to look for any "weak spots", meaning areas in which the present technology is, or may prove, unsound or at least weak and/or expensive. So far, after many years development, these areas appear to be few, and limited in negative effect. To such an extent as they are recognized to exist, they are discussed candidly in this section.

Moreover, something else can be gained from the discussion of the environment of the invention, and its performance limiting factors, within this section. The present invention will be seen to make good and full use of many powerful modern technologies including (i) two-photon recording, (ii) tracking technology for optical disks, notably including CD and DVD, (iii) lasers, (iv) electro-optic modulators including MEMS, SPM, FLC and PLZT; and (v) optical detector arrays, including CCDs, APD arrays and APS arrays. It may thus soon be recognized that the present invention benefits from synergism, effectively using many "pieces" that are themselves highly evolved in order to produce a new system that, in combination of its parts, far transcends the performance of any optical memory system with which these parts, and these technologies, have heretofore been associated.

Historically, when densities of rotating memory media increased, tolerances for errors decreased. If, as is hereinafter set forth in section 5, the present invention serves to very greatly increase the information storage density of optical media, notably optical disk, then careful and through thought would desirably be given to identifying just what pressures—ultimately potentially limiting system performances—are likely to be brought to bear on incorporated system components, and system processes. For example, need any of the wow, flutter, and/or rotational speed variation of the optical disk be improved, or even tightly maintained at present performance limits, in order to make the system of the present invention work? Or can (i) Manchester and Manchester -type codes for indexing rotating media for rate-variant information retrieval and/or (ii) signal processing to electronically correct for the misregistration of optical image data on a (CCD) optical detector array or otherwise, and/or (iii) larger optical domain sizes (simultaneously that there are more of these domains in three dimensions!) overcome such optical image misregistration as will inevitably exist? Generally the answer is no to the first question and yes to the later question; in putting more information in front of, and through, an optical read head, and onto an array of optical detectors, per unit time, the present invention does not commensurately stretch the required physical dynamic performance of either (i) the disk rotation system and/or (ii) the optical read head positioning system.

Any what about the quality of the fast appearing—and equally fast diappearing—optical image itself? Is it of high quality, with a good signal-to-noise, or not? A quality optical image, and good optical signal-to-noise ratio is generally realized in the optical memory system of the present invention because (i) the preferred two-photon writing, and one-photon reading, processes are very "clean" unlike previous similar optical memories), with no untoward changes nor any degradation(s) being experienced in the memory medium. Meanwhile, and nonetheless that the preferred domain/voxel size/volume is very small, (ii) the focal regions of the lenses which image the tilted data plane segments are highly dimensionally tolerant so as to efficiently and effectively image any data plane segment appearing in front of the lenses.

This fact that the 3-D CD of the present invention can deliver data a million times faster, from an optical disk containing a million times more data, than heretofore incurring without any significant increase in the precision of the data acquisition process can best be understood if it is first considered that an existing tracking system for an optical disk must generally position the optical read head, or sensor, in both the x and y coordinates above the surface of the disk. The multi-bit, bit plane, optical sensor head of the present invention requires but little more—requiring only that the x-y skew angle of the head relative to the data track, or band, must also be maintained within tolerance. This is not difficult. It is innate of the optical read head moves along a radius to the spinning disk, as is preferred, and is initially aligned at the factory. Therefore the identical same optical read head positioning that presently suffices to read but a single bit will now (with some slight attention that angular skew error should not be too great) suffice to literally read millions of bits (see the performance specification of section 5 below).

It might reasonably be inquired as to whether the new form, depth transfer, doubly-telecentric afocal, imaging system of the present invention might require some tight control in the z axis, or its height above the spinning disk. It does not. The 3-D CD of the present invention is highly tolerant of flutter.

The detector array, especially when inexpensively fabricated from Charge Coupled Devices (CCD's) or APD arrays or APS arrays, is —quite curiously because of the vaunted high speeds of CCDs as developed for video imaging applications—under a bit of performance stress in the 3-D CD optical memory application of the present invention. Namely, those CCD's that have been developed for all sorts of common video and still cameras have an appropriate resolution, but are limited in sensitivity at high speed. In other words, the speed-sensitive product of commercially available CCD devices is not as good as would be desired for the 3-D CD of the present invention. Luckily, the sensitive CCD's developed for astronomical telescopes are applicable. Moreover, the entire CCD technology is well evolved to satisfy the task presented it by the present invention, even if the CCD's ultimately to be preferred are not "catalog items" circa 1998.

Writing, even more so than reading, of the 3-D CD of the present invention is a function of the sensitivity of (i) the preferred photochromic chemicals, and (ii) the (write) illumination intensity. Writing also involves (iii) a method and apparatus by which the write illumination is selectively masked so as to be encoded with binary data. The read/write ability, and the reread/rewrite ability, of the preferred photochemical of the present invention—spirobenzopyran—is pretty good. However, if the write speed is high, then the write light source must be bright, and this presently dictates use of a small laser. Although readily available and well proven, such a laser is an item of some hundreds of dollars potential cost in the 3-D CD system of the present invention that is otherwise (by and large, possibly excepting high performance write encoders next discussed) built from components costing but few dollars, and less. Work is underway to migrate the 3-D CD system of the present invention to a much less expensive laser diode, which use of a laser diode will likely require (i) a diode of improved brightness simultaneously with (ii) a photochemical of improved optical efficiency.

The write (laser) light wave front is presently encoded with arrayed micro-mechanical switches (MEMS), or with a spatial light modulator (SLM) available from Texas Instruments, or with an electro-optic modulator of the FLC or PLZT type. Present MEMS, SLMs and EO modulators are however, quite understandably, (i) optimized on communications switching and not for optical memories, and (ii) modestly expensive. Further development of cost efficiencies in this area is proceeding.

Even with (i) a modestly bright laser encoded by (ii) a MEMS or a SLM or an EO modulator array, the photochemical within the optical domains, or voxels, must—although chemically capable of changing state (isomeric molecular form, in the case of the preferred spirobenzopyran) almost instantaneously—receive adequate light energy to induced it to do so, making that such amount of light energy as is commonly "pumped into" the data domains, or voxels, by the masked laser in order to write data in these domains can benefit from a modest "write dwell" time. One way to have a longer write time than read time is to slow the rotation of the disk. Another way is to write each domain more than once. An 3-D CD of the present invention using a one (1) watt 10 watt laser for writing does not at the present time, and despite its great parallelisms, as fast as than the magnetic disk media with which it sometimes competes.

Finally, there is the issue of the stability of the photochemicals themselves. Remember, the 3-D CD of the present invention does not involve hole burning, and the entire read/write/erase process is reversible, the 3-D CD media being capable of being written and read many times. Since the so-called read-writeable (RW) optical disks that are presently commercialized in the word do not use two-photo processes, nor 2-P photochemicals, this entire area might be considered high risk. It is necessary that data, once written to the 3-D CD media at any place at any time with any specific equipment, should be capable of being reliably read at another place, and/or at another time and/or with different equipments that need not be in any very precise correspondence—or at least no better than existing standards for optical and of magnetic recording.

A related challenge to reading and writing an optical memory in accordance with the present invention cleanly and accurately under all conditions at any place at any time is the reliable persistence of the photonically induced photochemical changes in the memory. The persistence of optically-induced states of the preferred photochemical of the present invention—spirobenzopyran —is pretty good. Additionally, other promising photochromic chemicals are under development at many locations (but are as of yet unproven in actual 3-D CD system operation). Normally, however, it is expected that, in this area of stability, storage degradation considerably in excess of what is experimentally expected could be countenanced by the system, and data successfully recovered, well before actual data loss should ensure.

This discussions of the preceding paragraphs, howsoever brief, are somewhat unusual in that a patent specification need only tell what the invention is, and need not discuss the economy of its implementation nor its limitations nor its environment of use. In other words, it would be possible to represent the present invention as being simply an elegant combination of but (preferably) two convex lenses of simple shape so as to permit that a large number of voxels within each tilted image plane segment within an optical disk should be reliably accurately imaged in parallel, and with constant magnification and low aberration, onto a conjugate image plane, and ultimately onto arrayed masked emitters (for writing) or onto arrayed detectors (for reading).

However pivotal this depth transfer imaging system is to the present invention, the present invention is somewhat more. The present invention is a synergetic synthesis of many developments—two-photon recording and memories, photochromic chemicals, optical disk tracking, electro-optic modulators and MEMS, and even CCD's—that have been long in the making. When "put together in the right way", which this invention modestly attempts to do, there are no unaccounted for, let along insurmountable, problems to achieving performance that is, with all due modestly, truly impressive. It is this impressive performance, immediately next set forth, which is why the limitations and boundaries of the present invention have been candidly discussed. The discussion of the present invention within this specification might be considered analogous to discussing the potential of fiber optics—which technology has been very impressive to date—in the initial patent applications for optical fibers. In other words, if a fiber optic invention was reasonably legitimately foreseeably capable of transmitting some gigabits, rising to some terabits, per second, then it would have been reasonable to have said no in an early patent application directed to such fiber optic invention. The present invention being an optical memory that is capable of reading some gigabits, reasonably rising to some terabits, per second, it is now reasonable to bluntly say so.

5. Chemistry and Photochemistry of the Preferred Memory Store

The present invention is based on new chemical admixtures suitably contained within a transparent matrix so as to implement the store of a radiation, also know as an optical, memory. The complete optical memory also includes (i) radiation, normally laser light, sources to write and to read the storage, (ii) means of impressing information on a radiation beam so as to selectively write selected portions of the store, and (iii) means of detecting information within radiation within, or resulting from, radiatively interrogating portions of the store that were previously radiatively written. The memory store may be either (i) planar in a single layer, or (ii) a three-dimensional (3-D) volume.

The preferred embodiment of the present invention makes use of a new chemical, or photochemical, invention of other persons, namely Drs. Peter Rentzepis and Alexander Dvornikov of the University of California, Irvine, presenting new, and slightly changed, opportunities and techniques for radiatively manipulating (i.e., writing or reading or erasing) the optical memory store which the chemicals/ photochemicals essentially serve to create. For example, certain variants of the chemical/photochemical admixtures may be both radiatively (i) written and (ii) read by but one single beam of radiation (i.e., a "one-photon" process). Meanwhile, other variants of the admixtures are (i) written by two temporally and spatially simultaneous radiation beams in a two-photo process, but are (ii) read in a one-photon process.

The preferred optical memory store of the present invention contains an admixture consisting essentially of (i) dye precursor molecules reactive with at least one of acids, bases, ions or radical to produce dye molecules having differing spectroscopic properties than do the dye precursor molecules, and (ii) light-sensitive molecules that, when exposed to light, undergo photochemical reaction so as to form at least one of the acids, bases, ions or radical with which the dye precursor molecules are reactive.

Simply stated, the dye precursor molecules, although not reactive with the light-sensitive molecules before these molecules are radiated, are reactive with at least one of the acids, bases, ions or radicals that are photo-generated from the light-sensitive molecules so as to form the dye molecules. The admixture is held in a stable matrix that, nonetheless to its stability, permits of the very slight, molecular scale, chemical migration as permits of the chemical combination of the photo-generated acids, bases, ions or radicals with the dye precursor molecules.

"Writing" a matrix containing the admixture is a straightforward matter of (i) radiatively illuminating selected domains, or voxels, with a first-frequency, "write" radiation (of plural radiations, collectively) so as to cause the light-sensitive molecules to undergo photochemical reaction form an acid, base, ion or radical (and most commonly, an acid), and (ii) permitting the locally-produced acid, base, ion or radical to chemically react with the local dye precursor molecules to produce dye molecules. Both (i) radiatively-induced changes, and (ii) chemical reaction, can be induced to, and do, transpire fairly quickly. However, the true forte of the optical memory is its speed and parallelism on readout, next discussed.

This selective, regional, formation of the dye is how the memory store is radiatively written. Just as important as which chemical components of the admixture interact with the incident "write" radiation to change is which components do not. The dye precursor molecules are transparent to a first-frequency, "write" radiation (or radiations, in combination), which "write" radiation affects only the light-sensitive molecules. For that matter, the dye molecules themselves—as have been formed from chemical reaction of the precursor molecules and the molecules photo-generated from the "write" radiation—are unaffected by the write radiation. Namely, should a domain, or voxel, once be radiatively written, it is of no consequence nor any effect that it should be attempted to be "re-written", which in fact does nothing.

The fact that nothing will change from the "write" radiation save the dye precursor molecules is of great benefit if the "write" radiation can be selectively localized to only the dye precursor molecules of selected domains (or, in 3-D, voxels). Localized writing of domains in a plane is obtained simply by selectively illuminating the plane from either side. Localization writing of voxels in a volume is more complex. However, by two-photon absorption occurring from two intersecting write radiation beams, a 3 -D volume memory storage can also be precisely and cleanly "written" in only selected voxels.

Each of (i) the dye precursor molecules, (i) the dye molecules —as have been formed from chemical reaction of the precursor molecules and the molecules photo-generated from the dye precursor molecules—and (iii) the light-sensitive molecules are substantially insensitive to change by incidence of a second-frequency, "read", radiation at a second. This makes that an optical memory formed of these chemical components is "non-destructive readout".

However, the dye molecules—which have differing spectroscopic properties than do the dye precursor molecules—are very strongly detectable responsively to this second-frequency, read, radiation in some one(s) of their fluorescence, absorption or index of refraction.

The preferred dye molecules are both (i) colored (which goes to both absorption and index of refraction, and is indeed why these molecules are called "dye"), and (i) fluorescent, to impinging second-frequency radiation. This "impinging radiation " is how the memory store is read, and it is the induced fluorescence which is preferably detected (as opposed to, for example, the selective coloration, or the selected opacity). Note that even in a 3-D volume a single read radiation beam can be applied longitudinally along an entire plane to excite to fluorescence all the dye molecules in all the voxels in this plane. The selective fluorescence of the previously-written voxels can be detected orthogonally to the excited plane, as by charge Coupled Device (CCD) or the like. Since (i) a single bit plane may contain many thousands, or even millions, of bits, and (ii) the radiation-induced fluorescence is very fast, the optical memory storage can clearly be efficiently repetitively non-destructive read of vast amounts of information at high speeds.

An optical memory assembled of the preferred chemical and photochemical components is thus write-once, read-many, or WORM. Although the preferred radiation reading and writing is very "clean" affecting only the selected domains, even 3-D forms of the optical memory do not "grey out" with use. It is, however, desirable to shield the memory and its contained chemicals from extraneous radiation, especially in write frequency ranges. To this end, the memory store is commonly within a case, similarly to prior Winchester magnetic disk, or if hosed in a removable cartridge then the cartridge is commonly again contained in a case or envelope, again like magnetic disks.

5.1 Optical Properties of the Chemical Admixture, and Its Derivatives

The preferred chemical admixture, and its derivatives, are related in their optical properties in a very particular, and useful way.

Consider writing. In greater detail, the (un-reacted) dye precursor molecules are colorless and transparent to, and unreactive with, radiation within a particular first range of frequencies. However, the light sensitive molecules react with, and form an acid, a base, ions or radicals, in response to radiation within this first range of frequencies. This is relationship number one: appropriate "write" radiation changes the light-sensitive molecules but is without (direct) effect on the dye precursor molecules, which are transparent to the first-frequency radiation. The radiation is, by way of example, in a range from at least 630 to 670 nanometers wavelength.

Consider writing in parts. For an admixture—i.e., a memory store—that is already radiatively changed in some portion(s) while being unchanged in other portions—such as might commonly occur in 3-D volume memory store—a later application of the first-frequency "write" radiation (i.e., the 630–670 nanometers radiation) will not change any dye molecules then existing. Furthermore, the dye molecules are transparent to this (particular) radiation—as were the dye precursor molecules before them. Neither of these second relationships meed hole true for the present invention to function as, for example, a planar optical memory. However, these second relationships are very useful in realizing a 3-D volume optical memory store.

Consider reading. The (un-reacted) dye precursor molecules, and the light-sensitive molecules, are unreactive with radiation within a particular second range of frequencies to which second-frequency radiation the dye molecules are strongly reactive. The dye precursor molecules and the light-sensitive molecules most particularly do not fluoresce in response to second-frequency radiation within this frequency range. However, the dye molecules do react with radiation within this second range of frequencies to fluoresce. Morever—and as is not required but as might be guessed—the (un-reacted) dye precursor molecules, are—in their lack of reaction with the light-sensitive molecules—transparent to the second-frequency radiation. This is a third relationship: only dye molecules are reactive with the second-frequency radiation.

5.3 Specifically Preferred Chemical Admixtures

In one preferred admixture the dye precursor molecules consist essentially of rhodamine base. More particularly, the dye precursor molecules may be rhodamine 700 laser dye reacted with potassium hydroxide.

In this preferred admixture the light-sensitive molecules consist essentially of aromatic ortho-nitro-aldehyde compounds. These compounds serve as photo generators of acid. The preferred compounds are drawn from the group consisting of o-nitro-benzaldehyde and 1-nitro-2-naphaledehyde. Both of the o-nitro-benzaldehyde and the 1-nitro-2-naphaledehyde undergo, upon excitation with ultraviolet light, photo transformation into the same acid: nitroso acid.

If the (i) preferred rhodamine base is combined with the (ii) preferred compound of ortho-nitro-aldehyde then, upon excitation with ultraviolet light, the ortho-nitro-aldehyde undergoes phototransformation into nitroso acid and the rhodamine base reacts with this nitroso acid to form colored rhodamine B dye. Rhodamine B dye is know as a stable and efficient laser dye.

The dye precursor molecules may alternatively consist of vicinal dibromides acting as photo generators of acid.

5.4 Another Embodiment of the Chemical Admixture Particularly Supports a Two-Photon Write (One-Photon Read) Three-Dimensional Optical Memory (a 2-P 3-D Optical Memory)

Consider the reactions, and the indirect photo-generation, of dye, described in section 5.3 above. When the appropriate write radiation (the ultraviolet light) is shined upon a matrix containing the chemical admixture, than it will tend to created dye in all illuminated domains. This is fine if the illuminated memory store is planar, and one dimensional. However, if the optical memory store is configured as a three-dimensional volume, then localization of the write radiation to only the selected domains desired to be written is troublesome.

The solution to this problem is plural-photon, particularly two-photon, absorption—as is described by well known quantum mechanical equations. In a three-dimensional optical memory store written with two intersecting write radiation beams by process of two-photon absorption, only photochemicals present in domains where the two beams spatially and temporally intersect will be changed, and all photochemicals not in the intersection regions will be unchanged.

Clearly no special admixture is required to make the indirect dye creation process of the present invention work with, and by, the quantum mechanical process of two-photon absorption. What can be done with one photon—namely, the phototransformation of an aromatic ortho-nitro-aldehyde compound into nitroso acid—can also be accomplished with two photons.

However, certain admixtures that are particularly suitable for making of two-photon ("2-P") optical memories. Such 2-P optical memories are commonly (but need not invariably be) three-dimensional, or "3-D". Thus certain chemical admixtures are particularly directed at 2-P 3-D optical memories. Nonetheless to being written by two-photon absorption, and permissively also being read by two-photon absorption, the 2-P 3-D CD optical memory of the present invention is commonly read with but a single radiation beam in a single-photon process. Because the 3-D CD is illuminated in a plane slice of its volume, and the induced fluorescence is detected not along the illumination axis, but orthogonally thereto, it may readily be understood why a single radiation beam (i.e., one-photon) suffices for reading an optical memory, and why it is so valuable for the written domains to fluoresce as opposed to simply show color, or opacity.

Returning to the admixture embodiment particularly suitable to support 2-P processes, in such admixture the preferred dye precursor molecules are photo generators of acid by action of a chain reaction. In particular, the preferred precursor molecules are acid photo generators by action of the chain reaction of 1,2-dibromoethane in the presence of H-donors, the 1,2-dibromoethane being photo-decomposed in the presence of H-donors to form the acid HBr.

Alternatively, the dye precursor molecules may be acid photo generators by action of the chain reaction of 1,2-dibromoethane in the presence of i-propanol.

5.4 The Method of Using a Chemical Admixture with the 3-D CD Radiation (Optical) Memory According to the previous discussion, a photochemical method directing to creating stable molecules having any of emissions, absorption, coloration and index of refraction that are different from precursor molecules from which the stable molecules are formed may be recognized to be preferred in the memory store of the present invention.

The method entails placing within a matrix both (i) dye precursor molecules and (ii) light-sensitive molecules. The dye precursor molecules reactive with at least one of acids, bases, ions or radicals or produce dye molecules having differing spectroscopic properties than do the dye precursor molecules. The light-sensitive molecules, when exposed to light, undergo photochemical reaction so as to form at least one of the acids, bases, ions or radicals with which the dye precursor molecules are reactive.

The matrix and the light-sensitive molecules contained therein are illuminated with radiation so as to photo generate from the light-sensitive molecules at least one of the acids, bases, ions or radicals with which the dye precursor molecules are reactive. These photo generated acids, bases, ions or radicals are permitted to react with the dye precursor molecules to form the dye molecules.

Commonly the placing within a matrix is of (i) dye precursor molecules reactive with acids to produce dye molecules, and of (ii) light-sensitive molecules photo generating the acids with which the dye precursor molecules are reactive.

5.5 Overall Description of the New Optical Memory Materials

For the case of organic photochromic memory materials the binary codes, 0 and 1, are formed by the photo-chemical changes which lead to two distinct molecular forms with different structures. The write form of the memory material is usually colorless and absorbs light in UV region. The absorption of light by this form induces a photochemical reaction, which leads to formation of the written, colored form with the absorption spectrum shifted to the visible region. Accessing of information is based on the detection of fluorescence, emitted by the written bits, absorption or index of refraction change.

The new memory material was designed for ROM (Read Only Memory) or WORM (Write Once Read Many) devices, where the information should be written once, stored indefinitely, but may be retrieved an unlimited number of times. The new material is composed of an organic dye which has different structured when dispersed in acidic or basic host media. It is known, that some organic dyes, such as, for example Rhodamine B, may exist in two forms, depending on acidity and polarity of the matrix or solvent. One of these forms, Rhodamine B base, is colorless and shows complete lack of fluorescence. However, in the presence of acid, this colorless form undergoes transformation into a colored, strongly fluorescing dye, Rhodamine B, which is well known as a stable and efficient laser dye.

Using molecules, which have these properties, the present invention contemplates new optical storage materials, which are composed of two components: 1) a molecule, which when excited to its electronic excited state is converted into an acid or a base, radical or ion (referred to as an acid or base, radical or ion generator); and 2) an organic dye precursor, which reacts with the photo induced acid, base, ion to form a room-temperature stable, strongly-fluorescing dye. The write form of this memory material is the mixture of the generator and the dye precursor and the written form is the fluorescing dye material which is the product of the chemical reaction that takes place after photo activation.

Different generators and dye precursors were used to realize this novel memory material. As one example, o-nitro-benzaldehyde was used as an acid generator. O-nitro-benzaldehyde undergoes phototransformation into the corresponding nitroso acid upon excitation with UV light. Rhodamine B base was used as a dye precursor. Rhodamine B base was found to react well with the photo induced nitroso-acid to form the colored Rhodamine B dye.

After excitation with 355 nm light, the solution develops a strong pink color and a bright red fluorescence was observed from this form when the solution was illuminated with 532 nm light. An identical color change and fluorescence were observed, after 355 nm irradiation when these same two components were dispersed in solid PMMA matrices. In the case of solid matrices, both the unexposed and colored areas—i.e., the unwritten and written areas—of the polymer film or block did not show any spectral changes or degradation at room temperature, when they were stored in the dark.

To increase the efficiency of the writing process yet another new memory material—1-nitro-2-naphthaldehyde (NNA)—was utilized as the acid generator component instead of o-nitro-benzaldehyde. It was found that, if excited with UV light, NNA undergoes the same photochemical rearrangement to nitroso-acid as o-nitro-benzaldehyde. The nitroso-acid, after excitation of NNA with 355 nm light, reacts with Rhodamine B base transforming this colorless dye precursor into a deep colored fluorescing dye.

Accordingly, the initially colorless solution of the write form, composed of NNA and Rhodamine B base, is transformed to the colored, read form, when irradiated with UV light. The same process was observed when these components were dispersed in a rigid PMMA matrix and excited with light of the same wavelength. This polymer based light sensitive molecular system was successfully used as a ROM memory material.

7. Performance of a Three-Dimensional Compact Disk (3-D CD) in Accordance with the Invention The present, and prospective, parameters and performance of a three-dimensional compact disk (3-D CD) in accordance with the invention are as follows:

|  | Present "1" 3-D CD | Prospective "5 1/4" 3-D CD |
|---|---|---|
| Disk Physical Parameters |  |  |
| disk diameter (inches) | 1 | 5.25 |
| disk diameter (cm) | 2.54 | 13.3 |
| outer annular radius ($\mu$m) | 12,500 | 60,000 |
| inner annular radius ($\mu$m) | 2,500 | 20,000 |
| usable annular area ($\mu$m$^2$) | 471,238,500 | 10,053,088,000 |
| disk thickness ($\mu$m) | 6000 | 10000 |
| pi ($\pi$) | 3.14159 | 3.14159 |
| useful volume ($\mu$m$^3$) | $2.83 \times 10^{12}$ | $1.00531 \times 10^{14}$ |
| rotation rate | 1200 rpm | 1500 rpm |

-continued

|  | Present "1" 3-D CD | Prospective "5 1/4" 3-D CD |
|---|---|---|
| Domain (Voxel) Parameters |  |  |
| bit-lateral dimension ($\mu$m) | 2 | 1 |
| bit-plane thickness ($\mu$m) | 30 | 10 |
| bit volume ($\mu$m$^3$) | 120 | 10 |
| bits per mark (3D) | 2 | 8 |
| Chemical Parameters preferred photochemicals |  |  |
| Write Once Read Many (WORM) | nitro-naphthaldehyde | nitro-napthaldehyde |
| Erasable | spirobenzopyran | spirobenzopyran |
| preferred matrix | polymer plastic | polymer plastic |
| Capacity/Optical Parameters |  |  |
| raw capacity (GB) | 5.89 | 10053.09 |
| user capacity (GB, 50% OH) | 2.95 | 5026.54 |
| page size -x | 128 | 1000 |
| page size -y | 128 | 1000 |
| plane tilt angle (°) | 45 | 45 |
| # tracks per supertrack | 128 | 1000 |
| # layers per superlayer | 128 | 1000 |
| # bits per bit plane | 128 × 128 | 1000 × 1000 |
|  | 16364 | $10^6$ |
| supertrack radial thickness ($\mu$m) | 256 | 1000 |
| superlayer thickness ($\mu$m) | 134 | 525 |
| number supertracks/disk | 39 | 40 |
| number superlayers/disk | 45 | 19 |
| Reading |  |  |
| depth transfer objective | doubly telecentric afocal | doubly telecentric afocal |
| lens diameter (cm) | 1 | 1 |
| detector array | CCD | APS |
| Writing |  |  |
| light source | pulsed laser | pulsed laser |
| wattage (W) | 1 | 5 |
| light modulation | SLM | SLM |
| Performance |  |  |
| total storage capacity | 5.89 GB | 10 TB |
| local latency time in band ($\mu$sec) | 1 | 1 |
| seek time between farthest bands (ms) | 40 | 40 |
| integration time ($\mu$sec) | 10 | 1 |
| read data transfer rate (Mb/sec) | 1,638.4 | $1 \times 10^6$ |

It should be understood that any entry or entries of the above table could change. Indeed, and in accordance with (i) the scalability principles of optics, (ii) the availability of relatively move and relatively less accurate tracking systems at commensurate costs, and (iii) the several suitable technologies for each of the parallel detection and the parallel encoding of binary data impressed upon a light wave front, changes might even be expected. The point of the table is to definitize the present and short term prospective operational parameters of the invention.

Accordingly, and considering only the present-day 2.5 cm (1") 3-D CD of this specification disclosure, the read data rate is stupendously fast: a data plane segment of 128×128 pixels is read each microsecond, giving a data transfer rate of 1.6 gigabits per second. Moreover, at well-established optical domain sizes, the 2.5 cm (1") disk of nominal thickness 6 mm readily holds some 5.8 gigabits of information in typically some 39 separate read/write "supertracks" (perhaps more appropriately called "bands") and some 45 "superlayers".

In accordance with the principles of optics, the optical data recording and reading system of the present invention can be scaled even larger in size, and to even greater capacities and even faster data transfer rates. However, unless the disk is spun so fast so as to exceed hypersonic velocity at its edges, not much can be done as regards latency. Curiously, the 3-D CD of the present invention does not need the presence of air to "float" the read head, as required for magnetic disks. And prior optical disks have never been spun at super high speeds simply because the data cannot be reliably tracked that quickly. The 3-D CD or the present invention, in which bright fluorescence is induced in a photochemical within picoseconds, may well be suitable placed in an evacuated chamber with its lightweight disk spun at many thousands of RPMs. Furthermore, and in any case, it should be recalled, that, in accordance with the explanation above, local latency "in-band" is low, and many computer applications will never require more data than is available in a single supertrack (band).

Although the diffraction limits on spot size would seemingly place a limit on storage density, it is possible to use multiple colored chromatic chemicals, and to read and write in color, By so doing each physical domain can store multiple data bits—but this also is beyond the scope of this disclosure.

In accordance with these and other possible variations and adaptations of the present invention, the scope of the invention should be determined in accordance with the following claims, only, and not solely in accordance with that embodiment within which the invention has been taught.

What is claimed is:

1. A read or write or read-and-write head for an optical medium having a planar surface, the head comprising:

a depth transfer objective imaging system serving to image (i) voxels substantially in a plane segment located completely within the medium and tilted relative to the medium's planar surface to (ii) another, conjugate, plane segment, likewise tilted relative to the medium's planar surface, located outside of the volume of the medium.

2. The head according to claim 1 for use with an optical disk medium having planar major surfaces wherein the depth transfer objective imaging system serves to image (i) voxels substantially in a plane segment tilted relative to the planar major surfaces of the disk, located along a chord or a radius of the disk and within the volume of the disk, to (ii) the conjugate, plane segment, likewise tilted relative to the major planar surfaces of the disk and located outside of the volume of the disk.

3. The head for an optical disk medium according to claim 2 wherein the depth transfer objective imaging comprises:

a doubly-telecentric afocal lens imaging system.

4. The head for an optical medium according to claim 1 used as a read head further comprising:

a detector array in the conjugate plane segment, onto which detector array the image of the voxels is received.

5. The read head for an optical medium according to claim 4 wherein the detector array is about the same size as the plane segment of voxels within the optical medium; and wherein the conjugate plane segment is imaged by the depth transfer objective imaging system at about the same size as is the plane segment of voxels within the volume of the optical medium;

wherein the imaging of the voxels is one-to-one, and without magnification.

6. The read head for an optical medium according to claim 5 wherein the detector array is about the same optical distance in one direction from the depth transfer objective imaging system as the plane of voxels within the volume of the optical medium is in the opposite direction.

7. The read head for an optical medium according to claim 5 wherein the detector array is larger than the plane segment of voxels within the optical medium; and wherein the conjugate plane segment is imaged by the depth transfer objective imaging system at a larger size than is the plane segment of voxels within the volume of the optical medium;

wherein the imaging of the voxels is with magnification.

8. The read head for an optical medium according to claim 7 wherein the detector array is at a greater optical distance in one direction from the depth transfer objective imaging system than is the plane segment of voxels within the volume of the optical medium in the opposite direction.

9. The read head for an optical medium according to claim 4 wherein the detector array comprises:

an array of semiconductor devices.

10. The read head for an optical medium according to claim 9 wherein the detector array comprises:

an active pixel sensor.

11. The read head for an optical medium according to claim 9 wherein the detector array comprises:

a charge coupled device.

12. The head according to claim 1 for use as a read head with and for an optical disk medium having opposed planar major surfaces, the head further comprising:

a source of illumination, located in the plane of the optical disk, for radiatively illuminating a planar radial cross-section, tilted relative to the plane of the optical disk, across at least of portion of the annulus of the optical disk, which planar radial cross-section contains the plane segment of the voxels;

wherein the voxels are radiatively illuminated; and wherein the illumination is called orthogonal because, being in the plane of the disk, it is at a right angle to the imaging of the depth transfer objective imaging system.

13. The read head for an optical disk medium according to claim 12 wherein the source of illumination is sufficient, and sufficiently selective, to cause, of what is within a field of view of the depth transfer objective imaging system, that all, and only, those radiatively illuminated voxels in the plane segment that are within a predetermined state will fluoresce, and this fluorescence only will be imaging to the conjugate plane, while no fluorescence occurring outside this plane segment of the voxels is appreciably so imaged;

wherein fluorescence from voxels within the plane segment is imaged to the conjugate plane by the depth transfer objective imaging system.

14. The head according to claim 1 for use as a read head with and for an optical disk medium having opposed planar major surfaces, the read head further comprising:

a source of illumination, located to the side of the plane of the optical disk, for radiatively, illuminated a planar radial cross-section, tilted relative to the plane of the optical disk, containing the plane segment of the voxels;

wherein the voxels are radiatively illuminated; and wherein the illumination is called confocal-theta because, being on the side of the plane of the disk as is also the depth transfer imaging system, it makes an angle theta with an optical axis of the depth transfer imaging system.

15. The read head for an optical disk according to claim 14 wherein the source of illumination is sufficient, and sufficiently selective, to cause, of what is within a field of view of the depth transfer imaging system, that all, and only, those radiatively illuminated voxels in the plane segment that are within a predetermined state will fluoresce, and this fluorescence only will be imaged to the conjugate plane, while no fluorescence occurring outside this plane segment of the voxels is appreciably so imaged;

wherein fluorescence from voxels within the plane segment is imaged to the conjugate plane by the depth transfer imaging system.

16. The head for an optical medium according to claim 1 used as a read head further comprising:

a source of illumination radiation; and a beamsplitter in the optical path of the depth transfer imaging system and of the source of illumination radiation for directing the illumination radiation onto the plane segment of voxels;

wherein the voxels are radiatively illuminated; and wherein the illumination is called co-linear because it is in part along a same optical axis as is the imaging of the depth transfer imaging system.

17. The read head for an optical medium according to claim 16 wherein the source of illumination is sufficient, and sufficiently selective, to cause, of what is within a field of view of the depth transfer imaging system, that all, and only, those radiatively illuminated voxels in the plane segment that are within a predetermined state will fluoresce, and this fluorescence only will be imaged to the conjugate plane, while no fluorescence occurring outside this plane segment of the voxels is appreciably so imaged;

wherein fluorescence from voxels within the plane segment is imaged to the conjugate plane by the depth transfer imaging system.

18. The head according to claim 1 for use as a write head with and for an optical disk medium having opposed planar major surfaces, the write head further comprising:

an illuminator located in the plane of the optical disk for radiatively illuminating with a planar radial cross-section, tilted relative to the plane of the optical disk, across the entire annulus of the optical disk which planar radial cross-section the plane segment of voxels is a part;

a masked second illuminator, located in the conjugate plane, for radiatively selectively illuminating with a second frequency radiation through the depth transfer imaging system selective voxels within the plane of voxels;

wherein the first and the second illuminator jointly radiatively selectively illuminate selective voxels with the plane segment, tilted relative to the plane of the optical disk and located within the volume of the optical disk, with spatially and temporally coincident first and second frequency radiations sufficient so as to change a photochemical within the voxels of this plane segment, and not appreciably elsewhere within the volume of the optical disk.

19. A method of reading an optical medium having a planar surface comprising:

illuminating the voxels of a plane segment within the three-dimensional volume an optical disk, which plane segment is tilted relative to the planar surface of the optical medium;

imaging with a depth transfer objective imaging system (i) the voxels in the plane segment tilted relative to the major planar surface of the medium of (ii) another conjugate plane, likewise tilted relative to the major plane surface of the medium, located outside of the volume of the volume; and detecting with a detector array the optical properties of the imaged voxels as indicated of information stored in the voxels.

20. The method of reading an optical medium according to claim 19 applied to an optical disk having parallel planar major surfaces.

21. The method of reading an optical disk according to claim 20 wherein the illuminating comprises:

illuminating with a source of illumination, located in the plane of the optical disk, a planar radial cross-section, tilted relative to the plane of the optical disk, across the entire annulus of the optical disk, which planar radial cross-section contains the plane segment of the voxels;

wherein the voxels are radiatively illuminated; and wherein the illuminating is called orthogonal because, being in the lane of the disk, it is at a right angle to the imaging of the plane segment by the depth transfer objective imaging system.

22. The method of reading an optical disk according to claim 19 wherein the illuminating comprises:

illuminating with a source of illumination, located to the side of the plane of the optical disk, a planar radial cross-section, tilted relative to the plane of the optical disk, containing the plane segment of voxels;

wherein the voxels are radiatively illuminated; and wherein the illuminating is called confocal-theta because, being on the side of the plane of the disk as is the imaging of the plane segment by the depth transfer objective imaging system, it makes an angle theta with an optical axis of the imaging of the plane segment.

23. The method of reading an optical disk according to claim 19 wherein the illuminating comprises:

illuminating through a beamsplitter in the optical path of the doubly-telecentric afocal imaging system the plane segment of voxels;

wherein the voxels are radiatively illuminated; and wherein the illuminating is called co-linear because it is in part along a same optical axis as is the imaging of the plane segment by the depth transfer objective imaging system.

24. The method of reading an optical medium according to claim 19 wherein the imaging is by means of a doubly-telecentric afocal lens imaging system.

25. The method of reading an optical medium according to claim 19 wherein the detecting is with a detector array located in the conjugate plane.

26. The method of reading an optical disk according to claim 19 wherein the illuminating causes any ones of the illuminated voxels that are in a one of two stable states to fluoresce, and it is this imaged fluorescence that is detected with the detector array as the indication of information stored in the voxels.

27. A radiation memory comprising:

an optical medium having a planar surface and containing within addressable voxels within its three-dimensional volume photochemical suitably excited by radiation to produce a different output dependent upon which of the two stable states is presently assumed;

an illuminator for radiatively illuminating a multiplicity of voxels within a plane segment of an optical medium, which plane segment is within the volume of the optical medium and tilted relative to its planar surface;

a doubly-telecentric afocal lens imaging system for imaging (i) the illuminated voxels within the tilted internal plane segment of the optical medium to (ii) another, conjugate, image plane segment, likewise tilted relative to planar surface of the optical medium, that is located outside of the volume of the medium; and an array of radiation detectors, optically communicative with the conjugate image plane segment, for detecting optical properties of the illuminated and imaged voxels as indication of information stored in the voxels.

28. The radiation memory according to claim 27 wherein the optical medium is in the form of an optical disk.

29. The radiation memory according to claim 28 further comprising;

a motor for rotating the optical disk relative to the illuminator, the arrayed radiation detectors, and the doubly-telecentric afocal imaging system so that successive volumes of the optical disk, and of the photochemical, serve as the illuminated plane segment, making that data may be radiatively read from a 360° annular ring of the optical disk.

30. The radiation memory according to claim 29 further comprising;

a track means for moving the illuminator, the arrayed radiation detectors, and the doubly-telecentric afocal imaging system radially across the rotating optical disk so that successive adjacent volumetric annular rings of the optical disk may be read, ultimately permitting that data may be radiatively read from substantially the entire annulus of the optical disk.

31. The radiation memory according to claim 27 further comprising;

an electronic signal processing and data recovery means for interpreting the incident radiation individually detected at all the array radiation detectors as a binary data content of the arrayed voxels of the illuminated plane segment of the optical medium.

32. A memory system for reading by radiation a great multiplicity of datums stored in voxels within the three-dimensional volume of a body having a planar surface, the radiation memory system comprising:

a doubly-telecentric, meaning telecentric both in an object space and in an image space, afocal imaging system positioned adjacent the planar surface of the three-dimensional body so that a multiplicity of datums in a multiplicity of voxels within a plane segment that is within the body and tilted relative to the body's planar surface are imaged at constant magnification over a finite lateral extent across, the throughout a finite depth of, the tilted plane segment within the body, to a conjugate, image, plane segment located outside the three-dimensional body and likewise tilted relative to the body's planar surface;

means for radiatively illuminating the tilted plane, and all the multiplicity of datums in the multiplicity of voxels therein; and a detector, optically communicative with the tilted conjugate image plane, for optically detecting in a detection plane the individual responses of all the multiplicity of datums in all the multiplicity of voxels to the radiatively illuminating, the detecting of all responses being concurrent at the same time as these responses are collectively simultaneously imaged to the detector by the doubly-telecentric afocal imaging system.

33. The radiation memory system according to claim 32 further comprising:

means for moving the body relative to, collectively, the doubly-telecentric afocal imaging system, the radiatively illuminating means, and the detector;

wherein separate multiplicities of datums as are in associated separate multiplicities of voxels within successive tilted planes may be successively imaged, and detected.

34. The radiation memory system according to claim 33 wherein the three-dimensional body is in the form of a disk having a finite thickness, and wherein the means for moving the body comprises:

means for rotating the disk upon its axis.

35. The radiation memory system according to claim 34 wherein the three-dimensional body is in the form of a disk having a thickness of at least 5 millimeters; and wherein the datums are stored in voxels within layers within the disk not higher than 230 $\mu$m, and at lateral spacings within a layer not larger than 4 $\mu$m; and wherein the doubly-telecentric afocal imaging system images, the radiatively illuminating means illuminates, and the detector detects, the datums that are stored in voxels within at least 100 layers at the same time.

36. The radiation memory system according to claim 33 wherein the doubly-telecentric afocal imaging system comprises:

two spaced-parallel lenses with a common optical axis that is orthogonal to the planar surface of the three-dimensional body.

37. The radiation memory system according to claim 33 wherein the means for radiatively illuminating comprises:

a laser.

38. The radiation memory system according to claim 33 wherein the the detector comprises:

an array of active pixel sensors.

39. The radiation memory system according to claim 33 wherein the the detector comprises:

an array of charge coupled devices.

* * * * *

UNITED STATES PATENT AND TRADEMARK OFFICE
CERTIFICATE OF CORRECTION

PATENT NO. : 6,590,852 B1
DATED : July 8, 2003
INVENTOR(S) : Frederick Bossert McCormick, Jr.

It is certified that error appears in the above-identified patent and that said Letters Patent is hereby corrected as shown below:

<u>Column 1,</u>
Line 7, please insert the following:

-- FEDERAL FUNDS STATEMENTS
    This invention was made with Government support under Agreement F30602-98-3-0226 awarded by the Air Force. The Government has certain rights in this invention. --

Signed and Sealed this

Thirteenth Day of July, 2004

JON W. DUDAS
*Acting Director of the United States Patent and Trademark Office*